United States Patent
Yoshima et al.

(10) Patent No.: US 10,847,774 B2
(45) Date of Patent: Nov. 24, 2020

(54) ASSEMBLED BATTERY, BATTERY PACK AND VEHICLE

(71) Applicant: KABUSHIKI KAISHA TOSHIBA, Minato-ku (JP)

(72) Inventors: Kazuomi Yoshima, Yokohama (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 553 days.

(21) Appl. No.: 15/443,494

(22) Filed: Feb. 27, 2017

(65) Prior Publication Data

US 2018/0083252 A1 Mar. 22, 2018

(30) Foreign Application Priority Data

Sep. 21, 2016 (JP) ................. 2016-183706

(51) Int. Cl.
*H01M 2/22* (2006.01)
*H01M 2/26* (2006.01)
(Continued)

(52) U.S. Cl.
CPC ........... *H01M 2/206* (2013.01); *B60L 3/0046* (2013.01); *B60L 7/10* (2013.01); *B60L 50/64* (2019.02);
(Continued)

(58) Field of Classification Search
CPC ...... H01M 2/1077; H01M 2/202; H01M 2/22; H01M 2/26; H01M 10/441
See application file for complete search history.

(56) References Cited

U.S. PATENT DOCUMENTS

| 6,287,719 B1 | 9/2001 | Bailey |
| 2004/0028999 A1 | 2/2004 | Richard et al. |

(Continued)

FOREIGN PATENT DOCUMENTS

| EP | 1 833 107 A1 | 9/2007 |
| EP | 2 819 219 A1 | 12/2014 |

(Continued)

OTHER PUBLICATIONS

Extended Search Report dated Sep. 20, 2017 in European Patent Application No. 17158090.5.

*Primary Examiner* — Ula C Ruddock
*Assistant Examiner* — Frank A Chernow
(74) *Attorney, Agent, or Firm* — Oblon, McClelland, Maier & Neustadt, L.L.P.

(57) ABSTRACT

An assembled battery includes non-aqueous electrolyte batteries laminated with each other and at least one lead being interposed between two adjacent batteries. The lead is connected to the two adjacent batteries and has an area larger than that of a side surface of each battery, the side surface being opposing to the lead. Each battery includes at least one positive electrode, at least one negative electrode and a non-aqueous electrolyte. The positive electrode includes a current collector and positive electrode active material layers provided on both side surfaces of the collector. The negative electrode includes a negative electrode current collector and negative electrode active material layers provided on both side surfaces of the collector.

20 Claims, 15 Drawing Sheets

(51) Int. Cl.
  *H01M 10/44*    (2006.01)
  *H01M 2/20*     (2006.01)
  *H01M 10/04*    (2006.01)
  *B60L 50/64*    (2019.01)
  *B60L 3/00*     (2019.01)
  *B60L 7/10*     (2006.01)
  *H01M 2/10*     (2006.01)
  *H01M 10/0565*  (2010.01)
  *H01M 10/42*    (2006.01)

(52) U.S. Cl.
  CPC ......... *H01M 2/1077* (2013.01); *H01M 2/202* (2013.01); *H01M 2/22* (2013.01); *H01M 2/26* (2013.01); *H01M 10/0413* (2013.01); *H01M 10/0436* (2013.01); *H01M 10/0565* (2013.01); *H01M 10/425* (2013.01); *H01M 10/441* (2013.01); *H01M 2220/20* (2013.01); *H01M 2300/0082* (2013.01); *H01M 2300/0085* (2013.01); *Y10S 903/907* (2013.01)

(56) References Cited

U.S. PATENT DOCUMENTS

| | | |
|---|---|---|
| 2004/0072078 A1 | 4/2004 | Fukuzawa et al. |
| 2007/0210760 A1 | 9/2007 | Shimamura et al. |
| 2010/0015511 A1 | 1/2010 | Yoo et al. |
| 2010/0028723 A1 | 2/2010 | Haba |
| 2011/0045328 A1 | 2/2011 | Inagaki et al. |
| 2012/0021268 A1 | 1/2012 | Mailley et al. |
| 2012/0058371 A1 | 3/2012 | Carignan |
| 2015/0017522 A1 | 1/2015 | Miyatake et al. |
| 2016/0043375 A1* | 2/2016 | Saitoh ............... H01M 2/202 429/152 |
| 2017/0141433 A1 | 5/2017 | Yoshima et al. |
| 2017/0271707 A1 | 9/2017 | Sasakawa et al. |

FOREIGN PATENT DOCUMENTS

| | | |
|---|---|---|
| JP | 2002-518816 | 6/2002 |
| JP | 2004-303535 | 10/2004 |
| JP | 2005-149833 A | 6/2005 |
| JP | 2005-528741 A | 9/2005 |
| JP | 2007-324118 A | 12/2007 |
| JP | 4300310 | 7/2009 |
| JP | 2010-92841 A | 4/2010 |
| JP | 4784687 | 10/2011 |
| JP | 2012-521624 | 9/2012 |
| JP | 2013-131463 A | 7/2013 |
| JP | 2015-72836 A | 4/2015 |
| JP | 5894162 | 3/2016 |
| JP | 2017-168266 | 9/2017 |
| KR | 10-1154881 B1 | 6/2012 |
| WO | WO 2013/108841 A1 | 7/2013 |
| WO | WO 2016/113863 A1 | 7/2016 |

* cited by examiner

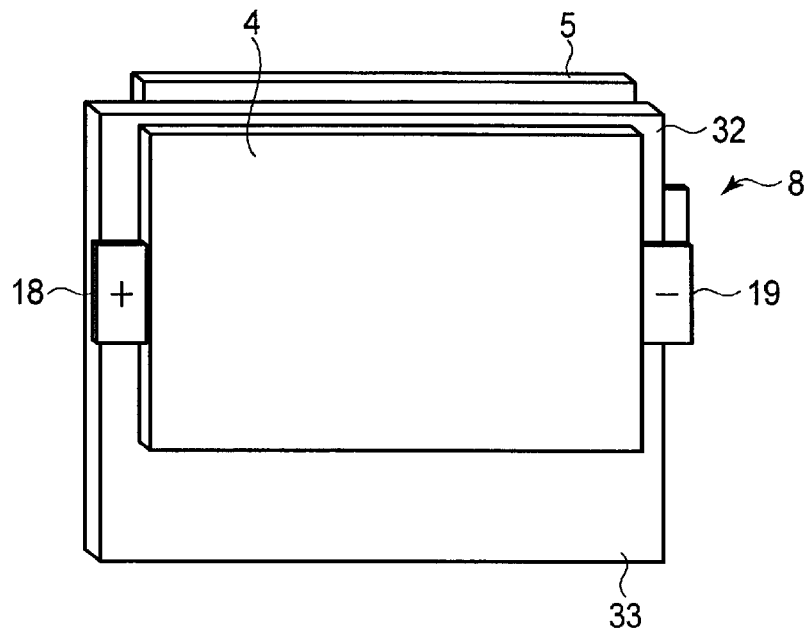
F I G. 11
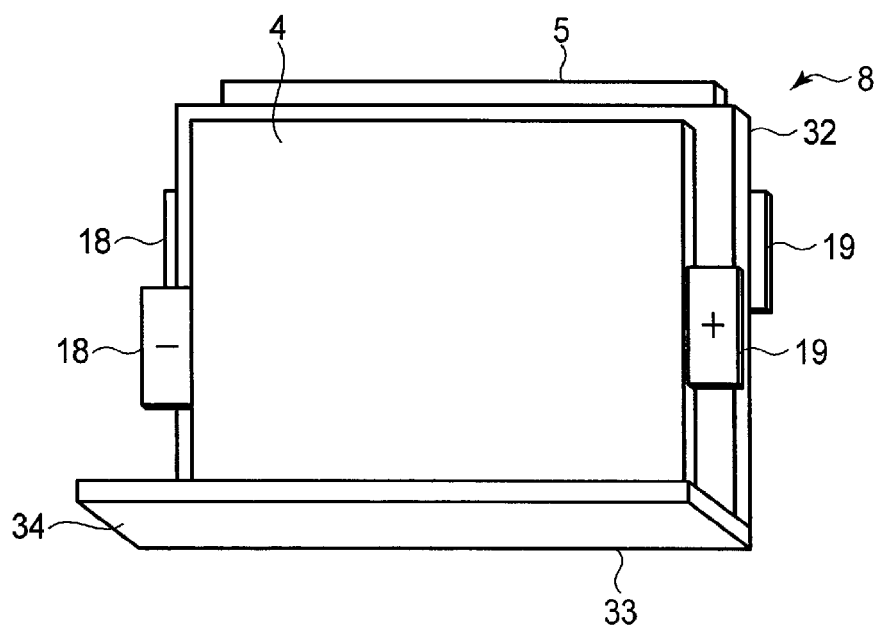
F I G. 12

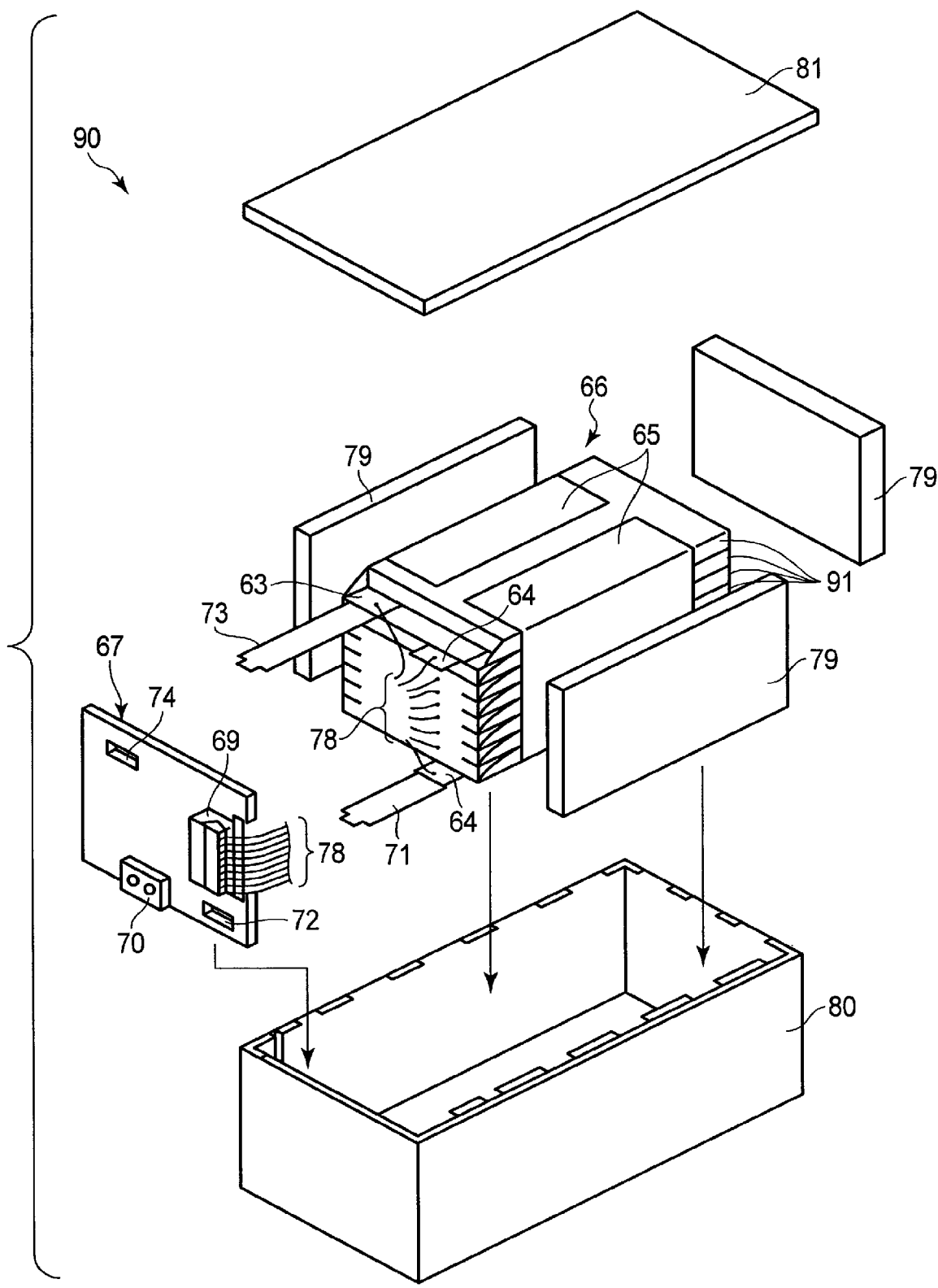
F I G. 16

ASSEMBLED BATTERY, BATTERY PACK AND VEHICLE

CROSS-REFERENCE TO RELATED APPLICATION

This application is based upon and claims the benefit of priority from Japanese Patent Application No. 2016-183706, filed on Sep. 21, 2016, the entire contents of which are incorporated herein by reference.

FIELD

Embodiments described herein relate generally to an assembled battery, a battery pack and a vehicle.

BACKGROUND

In recent years, research and development of lithium ion secondary batteries is actively conducted as a high energy-density battery. Lithium ion secondary batteries are expected to be used as an electric source of vehicles such as hybrid vehicles and electric vehicles or as an uninterruptible power supply of mobile phone base stations. However, even if a cell of a lithium ion secondary battery is made larger in size, the voltage obtained from the cell of the lithium ion secondary battery is a low voltage of about 3.7 V. Thus, to obtain a high output from a power supply using the cell of the lithium ion secondary battery, a power supply in which many cells of the lithium ion secondary battery are connected in series needs to be used. As a result, a size of the power supply grows becomes larger.

A bipolar battery is proposed as a cell that can be made smaller in size relative to its output. The bipolar battery uses a plurality of bipolar electrodes, each of which includes a current collector, a positive electrode active material layer formed on one side surface of the current collector, and a negative electrode active material layer formed on the other side surface of the current collector. These bipolar electrodes are arranged with an electrolytic layer being interposed between them and electrically connected in series. Since the plural bipolar electrodes are electrically connected in series in the bipolar battery, high power of a high-voltage and constant current can be obtained and further an electric resistance in the battery is small.

A lithium ion secondary battery uses a liquid electrolyte. And, positive electrodes and negative electrodes are repeated in one cell of the bipolar battery. Thus, if the liquid electrolyte used for the lithium ion secondary battery is applied to the bipolar battery, a short-circuit (liquid junction) may be caused by ionic conduction between the positive electrode and the negative electrode. Therefore, a structure of the cell of the lithium ion secondary battery using the liquid electrolyte cannot be adopted as a structure of the cell of the bipolar battery.

Heretofore, a bipolar battery using a polymeric solid electrolyte that does not include a liquid electrolyte has been proposed. Since the bipolar battery with this structure does not use the liquid electrolyte, there is no possibility of the short-circuit (liquid junction) due to the ionic conduction of the liquid electrolyte between the plurality of bipolar electrolytes. In general, however, an ionic conductance of the solid electrolyte is about 1/10 to 1/100 of that of the liquid electrolyte and is very low in comparison with that of the liquid electrolyte. Therefore, an output density of the bipolar battery in this structure is low and the bipolar battery in this structure is not yet in actual use.

In view of the above circumstances, a bipolar battery using a gel electrolyte obtained by making a liquid electrolyte being semisolid is proposed. The gel electrolyte is produced by soaking an electrolytic solution into a polymer such as polyethylene oxide (PEO), polyvinylidene difluoride (PVdF), etc. Since the gel electrolyte has a high ionic conductivity, an output density of a bipolar battery using the gel electrolyte can also be expected to be high.

On the other hand, there remains a problem to increase a size of the bipolar battery (to realize a higher energy density of the bipolar battery). As a method for realizing a higher energy density of the bipolar battery, there are considered a method in which electrode areas of positive and negative electrodes are increased and a method in which small-area bipolar type unit cells are connected in parallel. As one effective method, a method in which parallel-connected bodies (stacked bodies) are produced and the stacked bodies are connected in series inside a container for storing a battery body is considered. However, in this effective method, there is a large possibility in which the stacked bodies are in contact with each other to cause short circuit.

BRIEF DESCRIPTION OF THE DRAWINGS

FIG. 11 is a perspective view schematically showing the assembled battery of the sixth embodiment in a state in which a group of the first and second non-aqueous electrolyte batteries and the lead is folded and the batteries and the lead are stacked;

FIG. 12 is a perspective view schematically showing a laminate of the assembled battery of the sixth embodiment in a state in which the group of the first and second non-aqueous electrolyte batteries and the lead is folded and the batteries and the lead are stacked and further a part of the lead is bent;

FIG. 16 is an exploded perspective view schematically showing a structure of a battery pack using the assembled batteries of the first embodiment;

DETAILED DESCRIPTION

Figure 1:
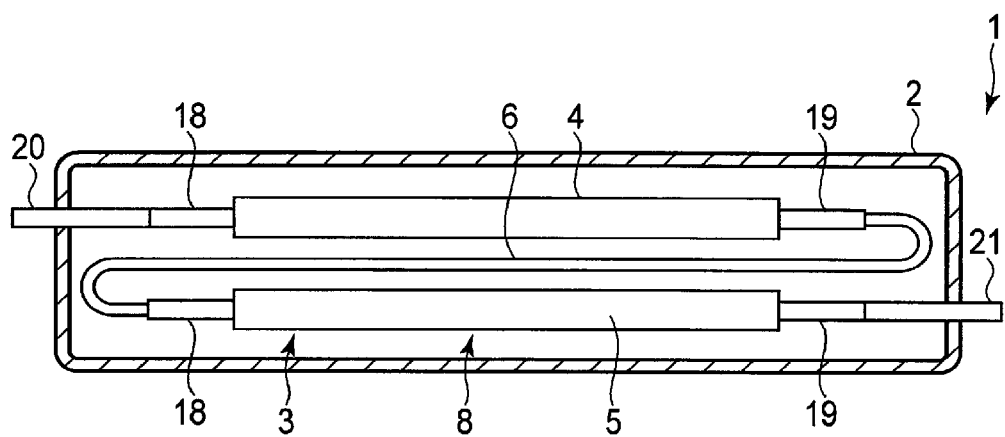
FIG. 1 is a cross-sectional view schematically showing the entire structure of an assembled battery of a first embodiment.

An assembled battery according to one embodiment comprises a plurality of non-aqueous electrolyte batteries laminated with each other and at least one lead being interposed between two adjacent non-aqueous electrolyte batteries. The at least one lead is connected to the two adjacent non-aqueous electrolyte batteries and has an area larger than an area of a side surface of each of the two adjacent non-aqueous electrolyte batteries, the side surface being opposing to the at least one lead. Each non-aqueous electrolyte battery includes at least one positive electrode, at least one negative electrode and a non-aqueous electrolyte. The at least one positive electrode includes a positive electrode current collector and positive electrode active material layers provided on both side surfaces of the positive electrode current collector. The at least one negative electrode includes a negative electrode current collector and negative electrode active material layers provided on both side surfaces of the negative electrode current collector.

A battery pack according to one embodiment comprises a plurality of assembled batteries, the assembled batteries being stacked and fastened with each other and electrically connected with each other. Each assembled battery comprises, a plurality of non-aqueous electrolyte batteries laminated with each other; and at least one lead being interposed between two adjacent non-aqueous electrolyte batteries. The at least one lead is connected to the two adjacent non-aqueous electrolyte batteries and has an area larger than an area of a side surface of each of the two adjacent non-aqueous electrolyte batteries, the side surface being opposing to the at least one lead. Each non-aqueous electrolyte battery includes at least one positive electrode, at least one negative electrode and a non-aqueous electrolyte. The at least one positive electrode includes a positive electrode current collector and positive electrode active material layers provided on both side surfaces of the positive electrode current collector. The at least one negative electrode includes a negative electrode current collector and negative electrode active material layers provided on both side surfaces of the negative electrode current collector.

A vehicle according to one embodiment comprises a battery pack including a plurality of assembled batteries, the assembled batteries being stacked and fastened with each other and electrically connected with each other. Each assembled battery comprises a plurality of non-aqueous electrolyte batteries laminated with each other and at least one lead being interposed between two adjacent non-aqueous electrolyte batteries. The at least one lead is connected to the two adjacent non-aqueous electrolyte batteries and has an area larger than an area of a side surface of each of the two adjacent non-aqueous electrolyte batteries, the side surface being opposing to the at least one lead. Each non-aqueous electrolyte battery includes at least one positive electrode, at least one negative electrode and a non-aqueous electrolyte. The at least one positive electrode includes a positive electrode current collector and positive electrode active material layers provided on both side surfaces of the positive electrode current collector. The at least one negative electrode includes a negative electrode current collector and negative electrode active material layers provided on both side surfaces of the negative electrode current collector.

Hereinafter, assembled batteries which relate to various embodiments, a battery pack which relates to one embodiment and an automobile which relates to one embodiment of a vehicle will be described with reference to drawings. The same reference numerals are attached to common components throughout the various embodiments and a duplicate description thereof is omitted. Each figure is a schematic view to describe an embodiment and to promote an understanding thereof. A shape, dimensions or scale ratios of an embodiment shown in each figure is different from a shape, dimensions or scale ratios of an actual apparatus. The shape, dimensions or scale ratios of the actual apparatus may be appropriately changed in consideration of descriptions below and publicly known technology.

First Embodiment

FIGS. 1 to 4B show a first embodiment. FIG. 1 is a cross-sectional view schematically showing the entire structure of an assembled battery 1 of the first embodiment. The assembled battery 1 of this embodiment includes an outer case 2 and a battery body 3 stored in the outer, case 2. The outer case 2 may have a structure to be described later and is formed of, for example, a laminate film in which a metal layer is interposed between two resin films.

In the battery body 3, two non-aqueous electrolyte batteries (a first non-aqueous electrolyte battery 4 and a second non-aqueous electrolyte battery 5) are stacked, and a sheet-like lead 6 is arranged between the stacked first non-aqueous electrolyte battery 4 and second non-aqueous electrolyte battery 5, the sheet-like lead 6 having an area larger than an area of a side surface of each of the first and second non-aqueous electrolyte batteries 4 and 5 and the side surface opposing the sheet-like lead 6. Here, the lead 6 is formed of, for example an aluminum foil. When the first non-aqueous electrolyte battery 4 and the second non-aqueous electrolyte battery 5 are stacked, they may not be in contact with each other, and they may not be in close contact with the lead 6 arranged in a gap between them.

Figure 2A:
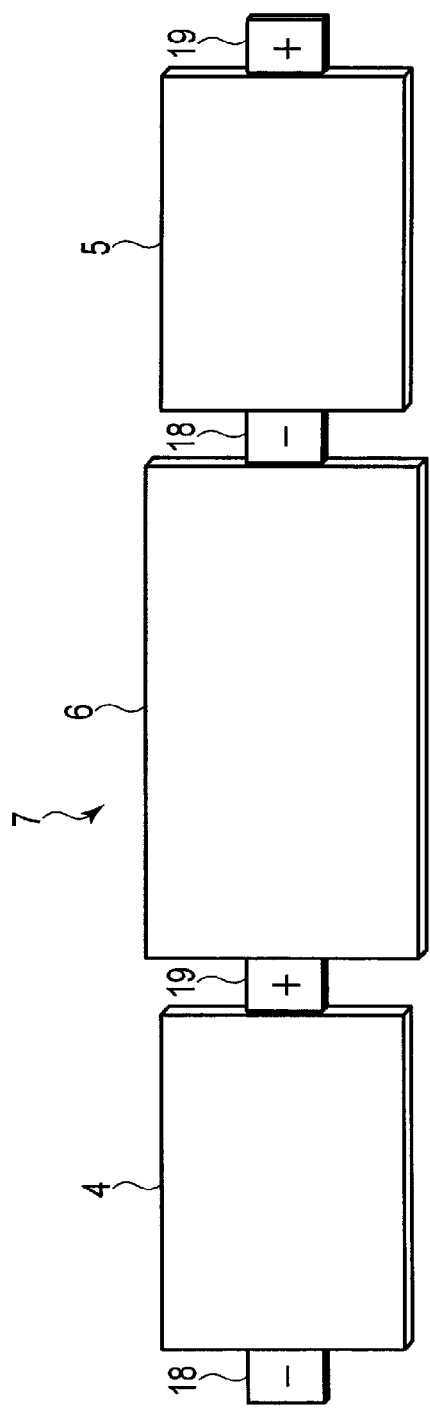
FIG. 2A is a plan view schematic showing the assembled battery of the first embodiment in a state in which first and second non-aqueous electrolyte batteries and lead of the assembled battery of the first embodiment are spread out.
Figure 2B:
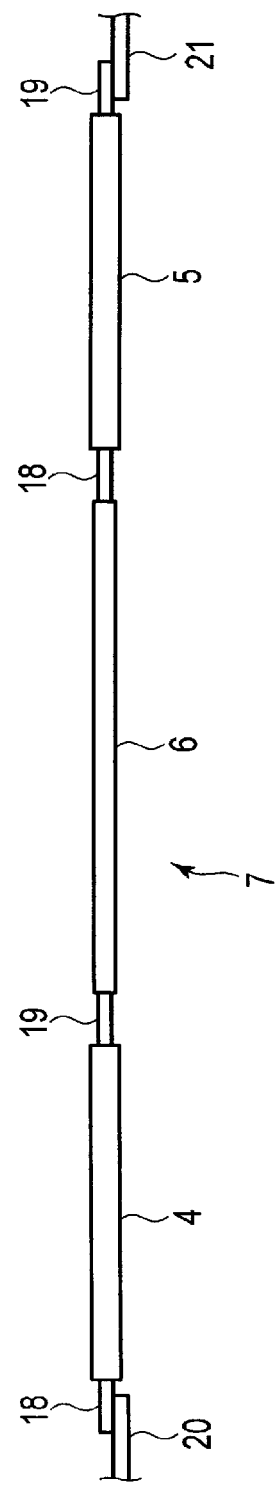
FIG. 2B is a side view of the assembled battery shown in FIG. 2A.

In the battery body 3 of this embodiment, as shown in FIGS. 2A and 2B, the first non-aqueous electrolyte battery 4 and the second non-aqueous electrolyte battery 5 are arranged on both sides of the lead 6, and they are electrically connected in series in a row so that a serially connected body 7 is formed. The linear serially connected body 7 is alternately folded and stacked into a laminate 8, and the laminate 8 is stored in the outer case 2, as shown in FIG. 1.

In the laminate 8 of this embodiment, the first non-aqueous electrolyte battery 4 is disposed above the lead 6 and the second non-aqueous electrolyte battery 5 is disposed below the lead 6. FIG. 2A is a plan view and FIG. 2B is a side view, both showing the first non-aqueous electrolyte battery 4, second non-aqueous electrolyte battery 5 and lead 6 of the battery body 3 in a state that they are stretched out.

Figure 3:
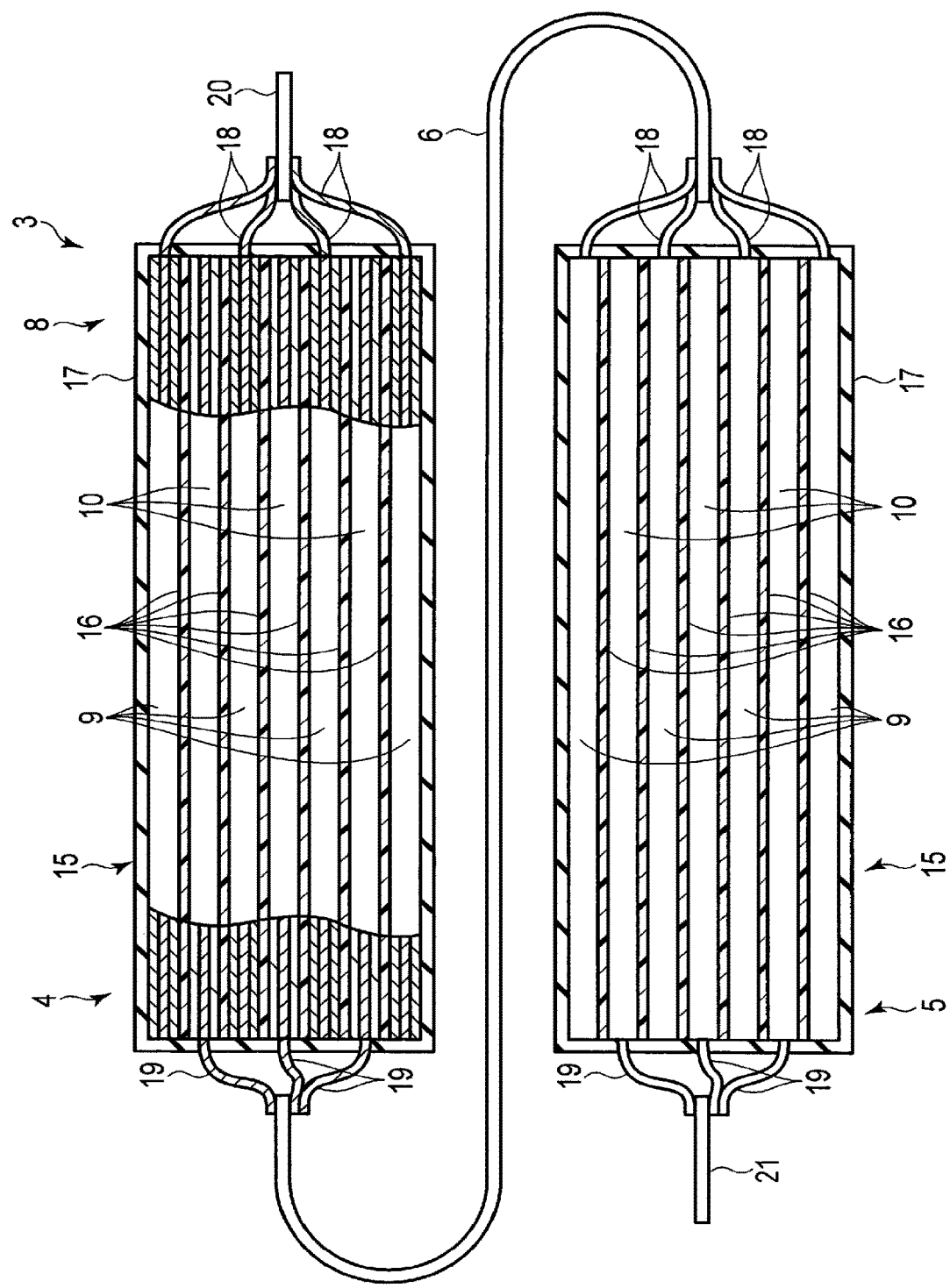
FIG. 3 is a longitudinal cross-sectional view schematically showing an internal structure of a laminate of each of the first and second non-aqueous electrolyte batteries of the assembled battery of the first embodiment.

FIG. 3 is a longitudinal cross-sectional view schematically showing an internal structure of the laminate 8 of the battery body 3. In this embodiment, the first non-aqueous electrolyte battery 4 and the second non-aqueous electrolyte battery 5 have the same structure. Thus, only the structure of the first non-aqueous electrolyte battery 4 will be described. The same components of the second non-aqueous electrolyte battery 5 as those of the first non-aqueous electrolyte battery 4 are denoted by the same reference numerals, and descriptions about them will be omitted.

The first non-aqueous electrolyte battery 4 includes a plurality of (four in this embodiment) negative electrodes 9, a plurality of (three in this embodiment) positive electrodes 10 and a non-aqueous electrolyte (not shown). The non-aqueous electrolyte is impregnated in an electrode group including the negative electrodes 9 and the positive electrodes 10.

The non-aqueous electrolyte may be a solid polymer electrolyte or a gel polymer electrolyte.

Figure 4A:
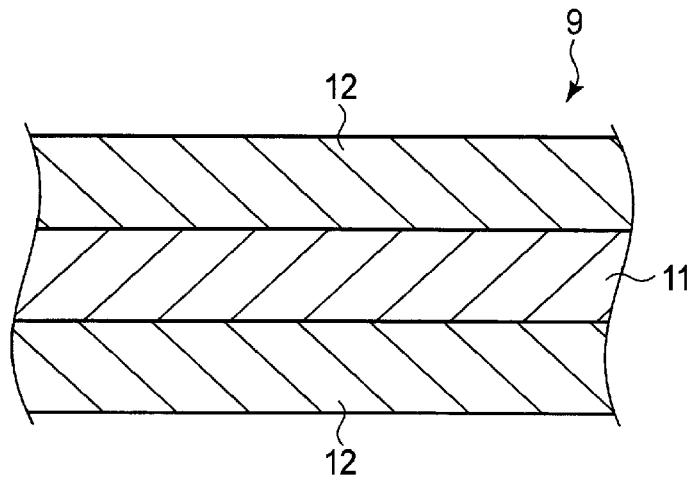
FIG. 4A is a longitudinal cross-sectional view schematically showing a structure of a main portion of a negative electrode of each of the first and second non-aqueous electrolyte batteries of the assembled battery of the first embodiment.
Figure 4B:
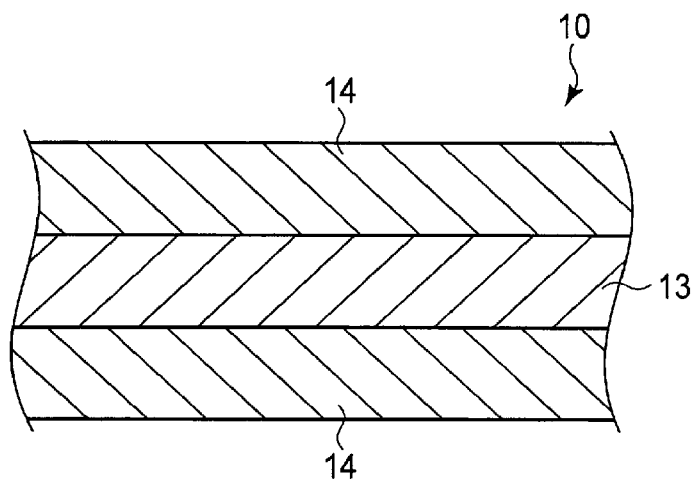
FIG. 4B is a longitudinal cross-sectional view schematically showing a structure of a main portion of a positive electrode of each of the first and second non-aqueous electrolyte batteries of the assembled battery of the first embodiment.

FIG. 4A is a longitudinal cross-sectional view of a main portion of an electrode structure of the negative electrode 9, and FIG. 4B is a longitudinal cross-sectional view of a main portion of an electrode structure of the positive electrode 10. The negative electrode 9 has, as shown in FIG. 4A, a negative electrode current collector 11 and negative electrode active material layers 12 stacked on both side surfaces of the negative electrode current collector 11. The positive electrode 10 has, as shown in FIG. 4B, a positive electrode current collector 13 and positive electrode active material layers 14 stacked on both side surfaces of the positive electrode current collector 13. The four negative electrodes 9 and the three positive electrodes 10 are alternately stacked and forms one laminate 15 including seven stacked electrodes in total. And, the first non-aqueous electrolyte battery 4 includes the one laminate 15. In the laminate 15, the negative electrode 9 is disposed in the lowermost position in FIG. 3, and the positive electrode 10 is stacked on the negative electrode 9 with a separator 16 being interposed between them. Moreover, the negative electrode 9 is stacked on this positive electrode 10 with the separator 16 being interposed between them. After this, the remaining positive electrodes 10 and the remaining negative electrodes 9 are alternately stacked with the separator 16 being interposed between them, and the negative electrode 9 is finally stacked. An exterior surface of the laminate 15 is covered with an insulating layer 17 such as a separator.

The first non-aqueous electrolyte battery 4 includes negative electrode tabs 18 and positive electrode tabs 19. The negative electrode tabs 18 are provided at right end portions of the four negative electrodes 9 as shown in FIG. 3, and the positive electrode tabs 19 are provided at left end portions of the three positive electrodes 10 as shown in FIG. 3. The negative electrode tab 18 is formed by extending a portion of the negative electrode current collector 11 outside the insulating layer 17. Similarly, the positive electrode tab 19 is formed by extending a portion of the positive electrode current collector 13 outside of the insulating layer 17.

The four negative electrode tabs 18 of the first non-aqueous electrolyte battery 4 are fixed and connected to an external connection portion 20 on a negative electrode side by welding, for example. The three positive electrode tabs 19 of the first non-aqueous electrolyte battery 4 are fixed and connected to one end curved portion (the left end portion in FIG. 3) of the lead 6 by welding, for example. With these connections, the four negative electrodes 9 and three positive electrodes 10 alternately stacked and forming an electrode group of the first non-aqueous electrolyte battery 4 are connected in parallel.

The four negative electrode tabs 18 of the second non-aqueous electrolyte battery 5 are fixed and connected to the other end curved portion (the right end portion in FIG. 3) of the lead 6 by welding, for example. The three positive electrode tabs 19 of the second non-aqueous electrolyte battery 5 are fixed and connected to the external connection portion 20 on a positive electrode side by welding, for example. With these connections, the four negative electrodes 9 and three positive electrodes 10 alternately stacked and forming an electrode group of the second non-aqueous electrolyte battery 5 are connected in parallel.

In this embodiment, when an electrical resistance of each of the first non-aqueous electrolyte battery 4 and second non-aqueous electrolyte battery 5 is represented by RA and an electrical resistance of the lead 6 is represented by RB, these electrical resistances RA and RB are so set such that RA≥RB.

Next, the components of the assembled battery 1 of this embodiment will be described in more detail.

<Negative Electrode 9>

The negative electrode 9 includes a negative electrode current collector 11 and a negative electrode layer (negative electrode active material layer 12) carried on one side surface or each of both side surfaces of the negative electrode current collector 11 and including an active material, a conductive agent and a binder.

The negative electrode current connector 11 preferably uses an aluminum foil of pure aluminum (purity: 100%) or aluminum alloy of the purity of 98% or more. As the aluminum alloy, an alloy including, in addition to aluminum, at least one element selected from a group including iron, magnesium, zinc, manganese and silicon is preferable. For example, an Al—Fe alloy, an Al—Mn based alloy and an Al—Mg based alloy can obtain a higher strength than the pure aluminum. On the other hand, a content of transition metal such as nickel, chromium or the like in the aluminum alloy is preferably set to 100 ppm or less (including 0 ppm). If the current collector is formed by, for example, an Al—Cu based alloy, the Al—Cu based alloy increases a strength of the current collector but deteriorates a corrosion resistance thereof. Therefore, the Al—Cu based alloy is not good for the current collector.

A range of more desirable aluminum purity is in 99.95 to 98.0%. In the present embodiment, by using titanium containing oxide particles in which an average particle size of secondary particles is 2 μm or more, it is possible to reduce a negative electrode pressing pressure and to reduce an elongation of the aluminum foil. As a result of this, an electron conductivity of the aluminum foil of the current collector can advantageously be increased and further, a negative electrode of low resistance can be produced by suppressing shredding of the secondary particles of titanium containing oxide.

As a negative electrode active material of the negative electrode active material layer 12, which occludes and emits lithium ions, carbon material, graphite material, lithium alloy material, metallic oxide and metallic sulfide can be cited. And, among others, it is preferable to select the negative electrode active material of at least one kind of titanium containing oxide which is selected from lithium titanium oxide, titanium oxide, niobium titanium oxide and lithium-sodium-niobium-titanium oxide, and in which an electric potential of lithium ion for its occlusion/emission is in a range of 1 to 3 V in a Li electric potential reference.

As lithium titanium oxide: lithium titanium oxide with a spinel structure that can be represented by the general formula $Li_{4+x}Ti_5O_{12}$ ($x: -1 \leq x \leq 3$); lithium titanium oxides with a ramsdellite structure such as $Li_{2+x}Ti_3O_7$, $Li_{1+x}Ti_2O_4$, $Li_{1.1+x}Ti_{1.8}O_4$ and $Li_xTiO_2$ ($x: 0 \leq x$); titanium oxides ($TiO_2$ as a structure before charging) with a monoclinic structure ($TiO_2$ (B) as a structure before charging), a rutile structure or with an anatase structure, each of which is represented by the general formula $Li_xTiO_2$ ($0 \leq x$), may be cited. Niobium titanium oxide is represented by $LiaTiMbNb_{2\pm\beta}O_{7\pm o}$ ($0 \leq a \leq 5$, $0 \leq b \leq 0.3$, $0 \leq \beta \leq 0.3$, $0 \leq \sigma \leq 0.3$, M is at least one element selected from Fe, V, Mo and Ta). And, these oxides may be used alone or in a mixed state. Lithium titanium oxide with a spinel structure the volume of which changes very little and which can be represented by the general formula $Li_{4+x}Ti_5O_{12}$ ($x: -1 \leq x \leq 3$) is more desirable. By using these titanium containing oxides, an aluminum foil which is the same as that of the positive electrode current collector 13, instead of a conventional copper foil, can be used for the negative electrode current collector 11 so that a weight reduction and lower costs of the negative electrode current collector 11 can be achieved.

An average particle size (diameter) of the secondary particles of the negative electrode active material is preferably larger than 5 μm. More desirably, the average particle size is 7 to 20 μm. In this range, a negative electrode of a high density can be produced while maintaining a pressure of the negative electrode pressing in low and thus, the elongation of the current collector of aluminum foil can be suppressed.

The secondary particles of the negative electrode active material having the average particle size which is larger than 5 μm can be obtained by firstly reacting raw materials of the active material to synthesize active material precursors as first particles having an average particle size which is 1 μm or less and then by calcining first particles. During this, the raw materials of the active material is broken by using a grinder such as a ball mill or a jet mill and the active material precursors are aggregated with each other to grow them to secondary particles of a large particle size. The average particle size of the first particles of the negative electrode active material is preferably 1 μm or less. AS a result of this, a high-input performance (quick charge) is remarkably improved. This is because, for example, a diffusion length of lithium ions in the active material becomes shorter and a specific surface area thereof increases. Incidentally, it is more preferable that the average particle size is 0.1 to 0.8 μm. It is also preferable to coat the surface of the secondary particle with a carbon material so that a resistance of the negative electrode is reduced. This can be achieved by adding precursors of carbon material into the active material precursors in a secondary particle production process and by calcining them at 500° C. or higher in an inert atmosphere.

Also, in the negative electrode active material layer 12 after producing the negative electrode 9, the secondary particles and first particles of titanium containing oxide may be mixed. In order to achieve a high density of the negative electrode active material layer 12, the first particles are preferably included in 5 to 50% by volume in the negative electrode active material layer 12.

The reason why the average particle size of the negative electrode active material is set to the above, range is as follows. If the specific surface area of the negative electrode 9 is increased to 3 to 50 m²/g by using first particles whose average particle size exceeds 1 μm, a fall in a porosity of the negative electrode 9 becomes unavoidable. However, if the average particle size becomes smaller, the particles are more likely to aggregate and a distribution of non-aqueous electrolyte may be concentrated in the negative electrode 9 so that a depletion of the electrolyte in the positive electrode 10 may be caused. Therefore, it is desirable to set a lower limit of the average particle size of the first particles to 0.001 μm.

The negative electrode active material desirably has the average particle size of 1 μm or less and the specific surface area by the BET method using $N_2$ adsorption is in a range of 3 to 200 m²/g. This cause an affinity of the negative electrode 9 with the non-aqueous electrolyte can further be increased.

The reason why the specific surface area of the negative electrode is specified in the above range will be described. If the specific surface area is less than 3 m²/g, an aggregation of particles becomes conspicuous, an affinity of the negative electrode 9 with a non-aqueous electrolyte decreases and an interfacial resistance of the negative electrode 9 increases. Thus, an output characteristic and charge and discharge cycle characteristic of the battery deteriorate. If the specific surface area exceeds 50 m²/g, on the other hand, a distribution of the non-aqueous electrolyte is concentrated in the negative electrode 9 and the shortage of the non-aqueous electrolyte is in the positive electrode 10 is caused and thus, output characteristics and charge and discharge cycle characteristic of the battery cannot be improved. A more desirable range of the specific surface area is 5 to 50 m²/g. Here, the specific surface area of the negative electrode 9 means a surface area thereof per one gram of the negative electrode active material layer 12 (excluding the weight of the negative electrode current collector 11).

The porosity of the negative electrode 9 (excluding the negative electrode current collector 11) is desirably set in a range of 20 to 50%. Accordingly, a high-density negative electrode 9 which is superior in the affinity with the non-aqueous electrolyte can be obtained. A more desirable range of the porosity is 25 to 40%.

The negative electrode current collector 11 is desirably made of aluminum foil or aluminum alloy foil.

A thickness of the aluminum foil or aluminum alloy foil is desirably 20 μm or less and more desirably 15 μm or less. A purity of the aluminum foil is desirably 99.99% or more. The aluminum alloy desirably contains at least one element such as magnesium, zinc, silicon or the like. On the other hand, a content of transition metal such as iron, copper, nickel, chromium or the like is desirably set to 100 ppm or less.

As the conductive agent, for example, a carbon material can be used. As the carbon material, for example, acetylene black, carbon black, coke, carbon fiber, graphite, aluminum powder, TiO or the like can be cited. Coke, graphite, powder of TiO, each having an average particle size of 10 μm or less, or carbon fiber having an average fiber diameter of 1 μm or less, all of which are processed with a heat-treatment temperature from 800° C. to 2000° C., is more desirable for the carbon material. A specific surface area of the carbon material by using $N_2$ adsorption is desirably 10 $m^2/g$ or more.

As the binder, for example, polytetrafluoroethylene (PTFE), polyvinylidene difluoride (PVdF), fluororubber, styrene-butadiene rubber, core shell binder and the like can be cited.

A compounding ratio of the active material, the conductive agent and the binder in the negative electrode 9 is desirably such that negative electrode active material is in a range of 80 to 95% by weight, the conductive agent is in a range of 3 to 18% by weight and the binder is in a range of 2 to 7% by weight.

The negative electrode 9 is formed by suspending the above described negative electrode active material, conductive agent and binder in an appropriate solvent, by coating a negative electrode current collector 11 with the suspension, by drying the suspension and by being subjected with a warming press. And, in this case, particles of the negative electrode active material are uniformly dispersed while a loading amount of the binder is small. If the loading amount of the binder is large, a dispersibility of the particles tends to increase. However, a surface of each particle is more likely to be covered with the binder and the specific surface area of the negative electrode is made to be small. If the loading amount of the binder is small, the particles are more likely to aggregate with each other. Therefore, by adjusting stirring conditions (the number of revolutions of a ball mill, a stirring time and a stirring temperature), an aggregation of the particles is suppressed. This can cause a uniform dispersion of fine particles so that the negative electrode 9 of the present embodiment can be obtained. Further, if the loading amount of the conductive agent is large while the loading amount of the binder and the stirring conditions are within proper ranges, the surface of the negative electrode active material layer 12 is likely to be coated with the conductive agent and also pores in the surface of the negative electrode 9 tend to decrease. Thus, the specific surface area of the negative electrode 9 tends to be small. If the loading amount of the conductive agent is small while the loading amount of the binder and the stirring conditions are within proper ranges, the negative electrode active material layer 12 is likely to be ground so that the specific surface area of the negative electrode 9 tends to increase, or the dispersibility of the negative electrode active material layer 12 falls so that the specific surface area of the negative electrode 9 tends to decrease. Further, in addition to the loading amount of the conductive agent, the average particle size and specific surface area of the conductive agent can affect the specific surface area of the negative electrode. And, it is preferable that the average particle size of the conductive agent is smaller than the average particle size of the negative electrode active material layer 12 and the specific surface area of the conductive agent is larger than the specific surface area of the negative electrode active material.

<Positive Electrode 10>

The positive electrode 10 includes a positive electrode current collector 13 and a positive electrode active material layer 14 carried on one side surface or each of both side surfaces of the positive electrode current collector 13 and including an active material, a conductive agent and a binder, etc. The positive electrode current connector 13 preferably uses an aluminum foil of pure aluminum (purity: 100%) or an aluminum alloy foil of the purity of 98% or more. As the aluminum alloy, an alloy including, in addition to aluminum, at least one element selected from a group including iron, magnesium, zinc, manganese and silicon is preferable. For example, an Al—Fe alloy, an Al—Mn based alloy and an Al—Mg based alloy can obtain a higher strength than that of the pure aluminum. On the other hand, a content of transition metal such as nickel, chromium or the like in the aluminum alloy is preferably set to 100 ppm or less (including 0 ppm). If the positive electrode current collector 13 is formed by, for example, an Al—Cu based alloy, the strength of the current collector is increased but a corrosion resistance thereof is deteriorated. Therefore, the Al—Cu based alloy is not good for the positive electrode current collector.

A range of more desirable aluminum purity is in 99.95 to 98.0%. When the aluminum purity is in this range, deterioration of a high-temperature cycle life due to dissolution of an impurity element can be reduced.

As the positive electrode active material layer 14, a lithium manganese composite oxide, a lithium nickel composite oxide, a lithium cobalt aluminum composite oxide, a lithium nickel cobalt manganese composite oxide, a spinel-type lithium manganese nickel composite oxide, a lithium manganese cobalt composite oxide, an olivine-type lithium iron phosphate ($LiFePO_4$), a lithium phosphoric acid manganese ($LiMnPO_4$) and the like may be cited.

For example, the lithium manganese composite oxides such as $Li_xMn_2O_4$ or $Li_xMnO_2$, lithium nickel aluminum composite oxides such as $Li_xNi_{1-y}Al_yO_2$, lithium cobalt composite oxides such as $Li_xCoO_2$, lithium nickel cobalt composite oxides such as $Li_xNi_{1-y-z}Co_yMn_zO_2$, lithium manganese cobalt composite oxides such as $Li_xMn_yCo_{1-y}O_2$, spinel-type lithium manganese nickel composite oxides such as $Li_xMn_{2-y}Ni_yO_4$, lithium phosphorus oxides having an olivine crystal structure, such as $Li_xFePO_4$. $Li_xFe_{1-y}Mn_yPO_4$ and $Li_xCoPO_4$, and fluorinated iron sulfate such as $Li_xFeSO_4F$ are cited. Herein, x and y are, unless otherwise specified, preferably in a range of 0 to 1.

If these materials are used, a high positive electrode voltage can be obtained. Especially, if the lithium nickel aluminum composite oxide, the lithium nickel cobalt manganese composite oxide or the lithium manganese cobalt composite oxide is used, a reaction with the non-aqueous electrolyte under high-temperature environment can be suppressed so that a battery life can be significantly increased. Particularly, the lithium nickel cobalt manganese composite oxide represented by $Li_xNi_{1-y-z}Co_yMn_zO_2$ ($0 \leq x \leq 1.1$, $0 \leq y \leq 0.5$, and $0 \leq z \leq 0.5$) is preferable. By using the lithium nickel cobalt manganese composite oxide, a high temperature durability life can be further improved.

As a conductive agent for enhancing electron conductivity and suppressing contact resistance with the positive electrode current collector 13, for example acetylene black, carbon black, graphite and the like may be cited.

As a binder for binding the positive electrode active material layer 14 and the conductive agent, polytetrafluoroethylene (PTFE), polyvinylidene fluoride (PVdF), fluorine rubbers and the like may be cited.

A compounding ratio of the positive electrode active material, the conductive agent and the binder in the positive electrode active material layer 14 is preferably that the positive electrode active material is in a range from 80% or more by weight to 95% or less by weight, the conductive agent is in a range from 3% or more by weight to 18% or less by weight, and the binder is in a range from 2% or more by weight to 7% or less by weight. When the compounding ratio of the conductive agent is 3% or more by weight, the above described effect can be achieved. When the compounding ratio of the conductive agent is 18% or less by weight, decomposition of the non-aqueous electrolyte on a surface of the conductive agent while the battery is preserved in high temperature can be reduced. When the compounding ratio of the binder is 2% or more by weight, sufficient electrode strength can be obtained. When the compounding ratio of the binder is 7% or less by weight, an insulating portion of the positive electrode 10 can be reduced.

The positive electrode 10 is produced by, for example, suspending the positive electrode active material, the conductive agent and the binder in an appropriate solvent, by applying this suspension on the positive electrode current collector 13, by drying the applied suspension and by pressing it. A positive electrode pressing pressure is preferably in a range from 0.15 ton/mm to 0.3 ton/mm. If the positive electrode pressing pressure is in this range, it is preferable because an adhesion (peel strength) of the positive electrode active material layer 14 to the positive electrode current collector 13 of the aluminum foil is enhanced, and, at the same time, the elongation percentage of the aluminum foil of the positive electrode current collector 13 is 20% or less.

The lead 6 is a sheet arranged to face one side surface of the non-aqueous electrolyte battery and having an area larger than an area of the one side surface of the non-aqueous electrolyte battery. As the aluminum foil of the positive electrode current collector 13, a pure aluminum foil (having a purity of 100%) or an aluminum alloy foil having a purity of 98% or more is preferably used. The aluminum alloy preferably contains, in addition to aluminum, one or more elements selected from the group consisting of iron, magnesium, zinc, manganese, and silicon. For example, an Al—Fe alloy, an Al—Mn-based alloy and an Al—Mg-based alloy can obtain higher strength than that of aluminum. On the other hand, a content of transition metal such as nickel, chromium and the like in the aluminum alloy is preferably 100 ppm or less (including 0 ppm). For example, an Al—Cu-based alloy enhances a strength but deteriorates a corrosion resistance. Therefore, the Al—Cu-based alloy is unsuitable for a lead. The aluminum purity is more preferably in a range from 99.95% to 98.0%. A thickness of the lead made of the aluminum having the above described aluminum purity is preferably 20 μm or more. However, if the thickness is too large, it becomes hard to handle the lead and its capacity per volume is reduced. Thus, the thickness is preferably 1 mm or less, more preferably 500 μm or less, and still more preferably 200 μm or less.

As a container (the outer case 2) storing the laminate 8 of the battery body 3, a metal container or a laminate film container may be used. As the metal container, a rectangular or cylindrical metal can formed of aluminum, aluminum alloy, iron, stainless steel or the like may be used. A plate thickness of the container is preferably 0.5 mm or less, and more preferably 0.3 mm or less.

As the laminate film, a multilayered film in which an aluminum foil is covered with a resin film may be cited. As the resin of the film, a polymer such as polypropylene (PP), polyethylene (PE), nylon, polyethylene terephthalate (PET) or the like may be used. A thickness of the laminated film is preferably 0.2 mm or less. The purity of the aluminum foil is preferably 99.5% or more.

The aluminum alloy forming the metal can preferably has an aluminum purity of 99.8% or less and contains elements such as manganese, magnesium, zinc, silicon and the like. Such an aluminum alloy as described above remarkably increase a strength of the metal can so that a wall thickness of the can be reduced. As a result, it is possible to achieve a thin and lightweight battery which has high output and is superior in heat radiation.

In the assembled battery 1 of this embodiment having the above described structure, the lead 6 is disposed between the first non-aqueous electrolyte battery 4 and the second non-aqueous electrolyte battery 5 in the outer casing 2, and the lead 6 has an area larger than each of the areas of the first non-aqueous electrolyte battery 4 and second non-aqueous electrolyte battery 5. Thus, the lead 6 can prevent the liquid junction between the first non-aqueous electrolyte battery 4 and the second non-aqueous electrolyte battery 5, both stacked in the outer case 2, caused by the non-aqueous electrolyte leaking from the first non-aqueous electrolyte battery 4 and/or the second non-aqueous electrolyte battery 5. Thus, an internal short-circuit between the first non-aqueous electrolyte battery 4 and the second non-aqueous electrolyte battery 5, both stacked in the outer case 2, can be prevented, and an energy density of the assembled battery 1 can be improved. Thus, for example, in comparison with a case where the first non-aqueous electrolyte battery 4 and the second non-aqueous electrolyte battery 5 are stored in two outer cases respectively and are connected in series, the number of parts can be reduced and the entire weight of the assembled battery 1 can be reduced.

Second Embodiment

Figure 5A:
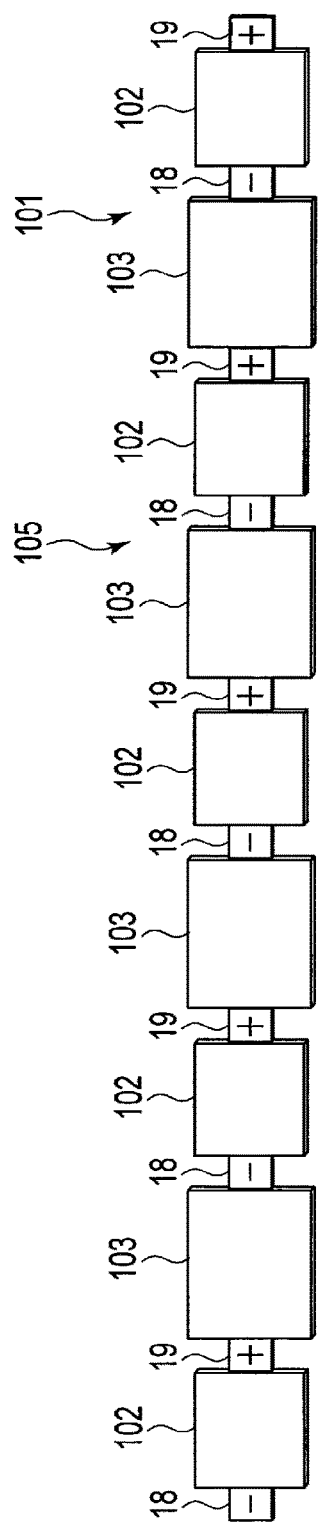
FIG. 5A is a plan view schematically showing an assembled battery of a second embodiment in a state in which non-aqueous electrolyte batteries and leads are spread out.
Figure 5B:
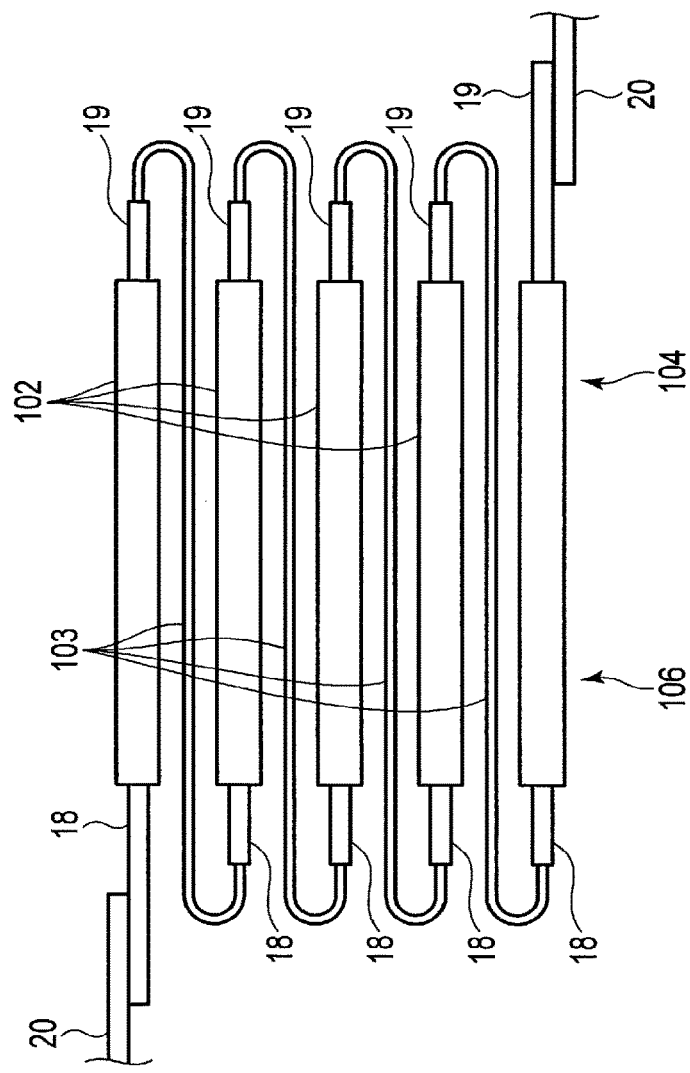
FIG. 5B is a side view of the non-aqueous electrolyte batteries and leads of the assembled battery of the second embodiment in a state in which a group of the non-aqueous electrolyte batteries and leads is folded to stack the batteries with one of the leads being interposed between them.
Figure 6:
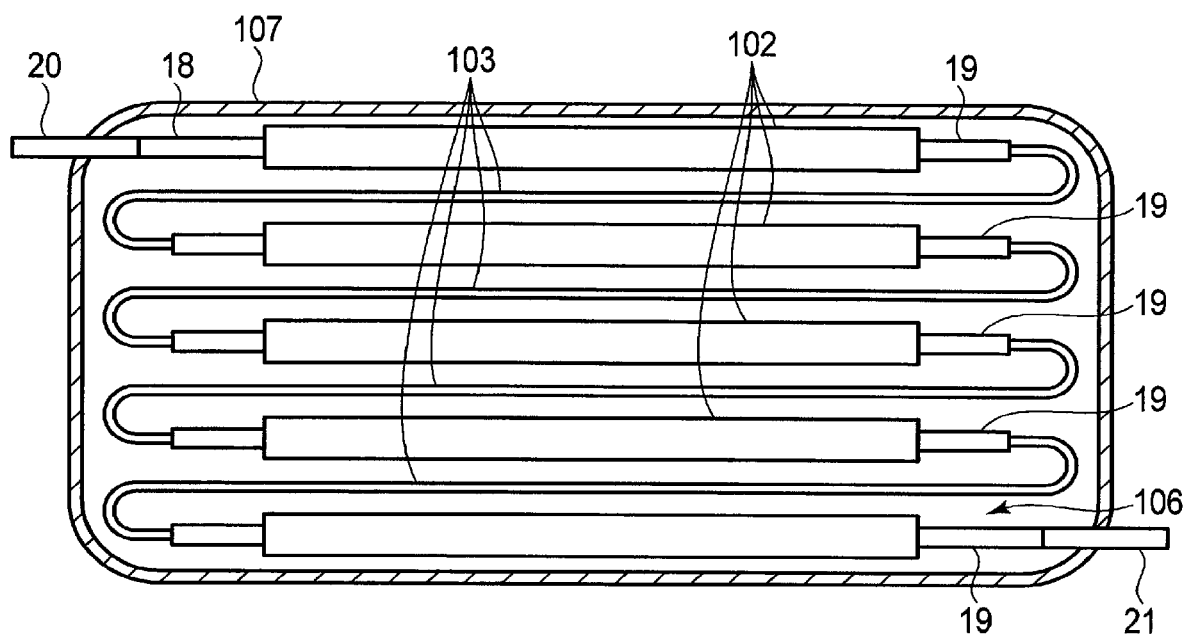
FIG. 6 is a cross-sectional view schematically showing a state in which the assembled battery of the second embodiment is stored in an outer case.

FIGS. 5A, 5B and 6 show a second embodiment. An assembled battery 101 of this embodiment has five non-aqueous electrolyte batteries 102, each having the same structure as that of the first non-aqueous electrolyte battery 4 (or the second non-aqueous electrolyte battery 5) of the assembled battery 1 of the first embodiment (see FIGS. 1 to 4B), and four leads 103 each having the same structure as that of the lead 6 of the first embodiment.

In a battery body 104 of this embodiment, as shown in FIG. 5A, the five non-aqueous electrolyte batteries 102 are connected in series in a row with the four sheet-like leads 103 being interposed between the five non-aqueous electrolyte batteries 102 and form a serially connected body 105. The linear serially connected body 105 is alternately folded between each non-aqueous electrolyte battery 102 and each sheet-like lead 103 to stack the five non-aqueous electrolyte batteries 102 and the four sheet-like leads 103 alternately and to form a laminate 106, as shown in FIG. 53. The linear serially connected body 105 formed into the laminate 106 is stored in an outer case 107, as shown in FIG. 6. In a stacked state of this embodiment, both end portions of each lead 103 for connecting tabs 18 and 19 of adjacent non-aqueous electrolyte battery 102 are curved and form curved portions.

Third Embodiment

Figure 7:
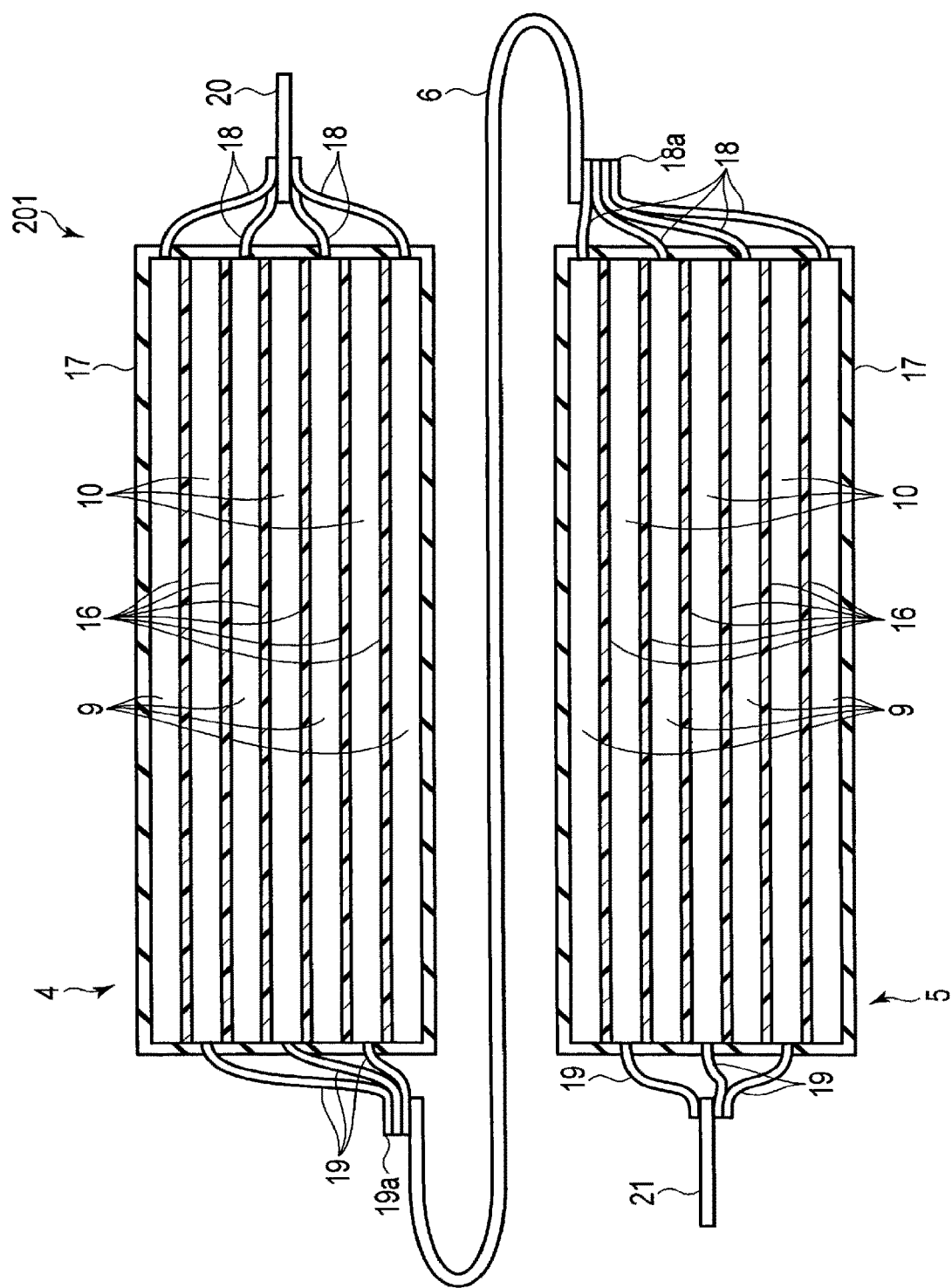
FIG. 7 is a longitudinal cross-sectional view schematically showing internal structures of laminates of an assembled battery of a third embodiment.

FIG. 7 shows a third embodiment. An assembled battery 201 of this embodiment includes the first non-aqueous electrolyte battery 4 and the second non-aqueous electrolyte battery 5, both of which are the same as those of the assembled battery 1 of the first embodiment (see FIGS. 1 to 4B). In the assembled battery 201 of this embodiment, a positive electrode tab stacked portion 19a in which three positive electrode tabs 19 of the first non-aqueous electrolyte battery 4 are stacked is provided. The positive electrode tab stacked portion 19a is fixed and connected to one side surface (the upper side surface in FIG. 7) of the lead 6 at its upwardly curved one end portion (the left end portion in FIG. 7) by welding, for example. In the assembled battery 201, a negative electrode tab stacked portion 18*a* in which four negative electrode tabs 18 of the second non-aqueous electrolyte battery 5 are stacked is further provided. The negative electrode tab stacked portion 18*a* is fixed and connected to the other side surface (the lower side surface in FIG. 7) of the lead 6 at its downwardly curved end portion (the right end portion in FIG. 7) by welding, for example. Other portions were produced as in the first embodiment.

Fourth Embodiment

Figure 8:
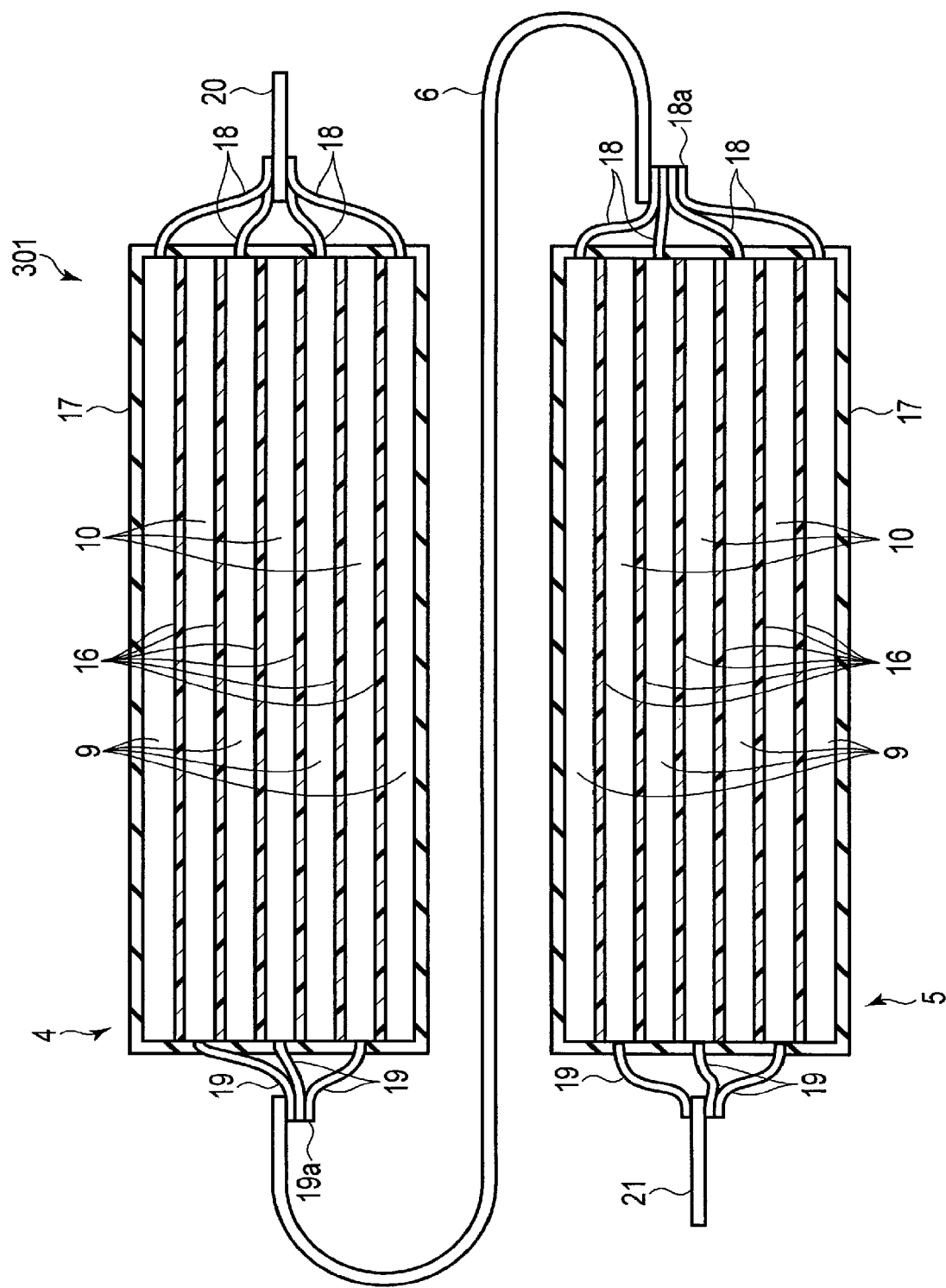
FIG. 8 is a longitudinal cross-sectional view schematically showing internal structures of laminates of an assembled battery of a fourth embodiment.

FIG. 8 shows a fourth embodiment. An assembled battery 301 of this embodiment includes the first non-aqueous electrolyte battery 4 and the second non-aqueous electrolyte battery 5 both of which are the same as those of the assembled battery 1 of the first embodiment (see FIGS. 1 to 4B). In the assembled battery 301 of this embodiment, a positive electrode tab stacked portion 19*a* in which three positive electrode tabs 19 of the first non-aqueous electrolyte battery 4 are stacked is provided. The positive electrode tab stacked portion 19*a* is fixed and connected to one side surface (the lower side surface in FIG. 7) of the lead 6 at its upwardly curved one end portion (the left end portion in FIG. 8) by welding, for example. In the assembled battery 201, a negative electrode tab stacked portion 18*a* in which four negative electrode tabs 18 of the second non-aqueous electrolyte battery 5 are stacked is further provided. The negative electrode tab stacked portion 18*a* is fixed and connected to the one side surface (the lower surface in FIG. 8) of the lead 6 at its downwardly curved other end portion (the right end portion in FIG. 8) by welding, for example. Other portions were produced as in the first embodiment.

Fifth Embodiment

Figure 9:
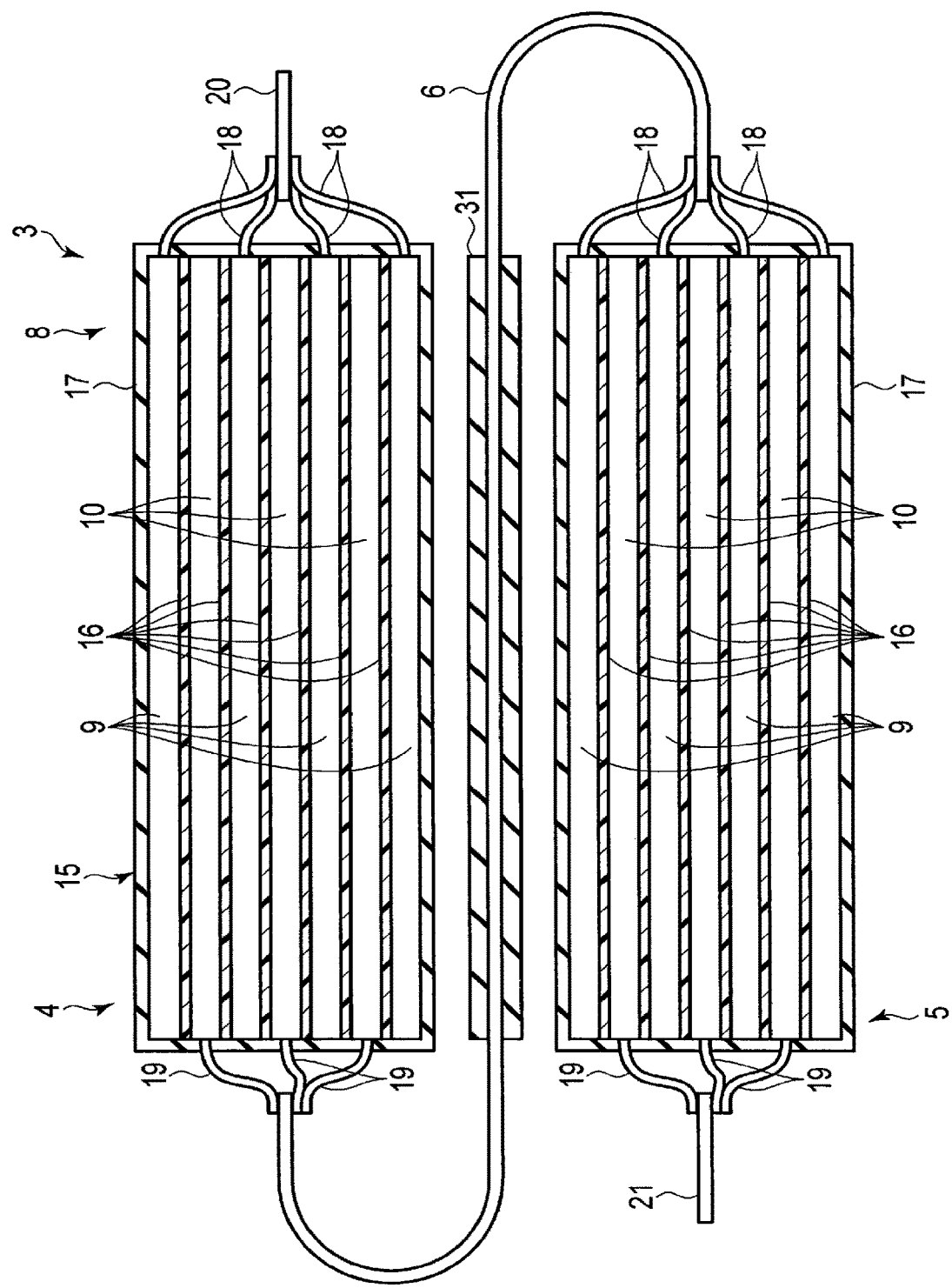
FIG. 9 is a longitudinal cross-sectional view schematically showing internal structures of laminates of an assembled battery of a fifth embodiment.

FIG. 9 shows a fifth embodiment. In this embodiment, insulating layers 31 each made of alumina particles and each having a thickness of 3 μm are provided on both side surfaces of the aluminum foil of the lead 6 disposed between the first non-aqueous electrolyte battery 4 and the second non-aqueous electrolyte battery 5 of the assembled battery 1 of the first embodiment (see FIGS. 1 to 4B). Other portions were produced as in the first embodiment.

Sixth Embodiment

Figure 10:
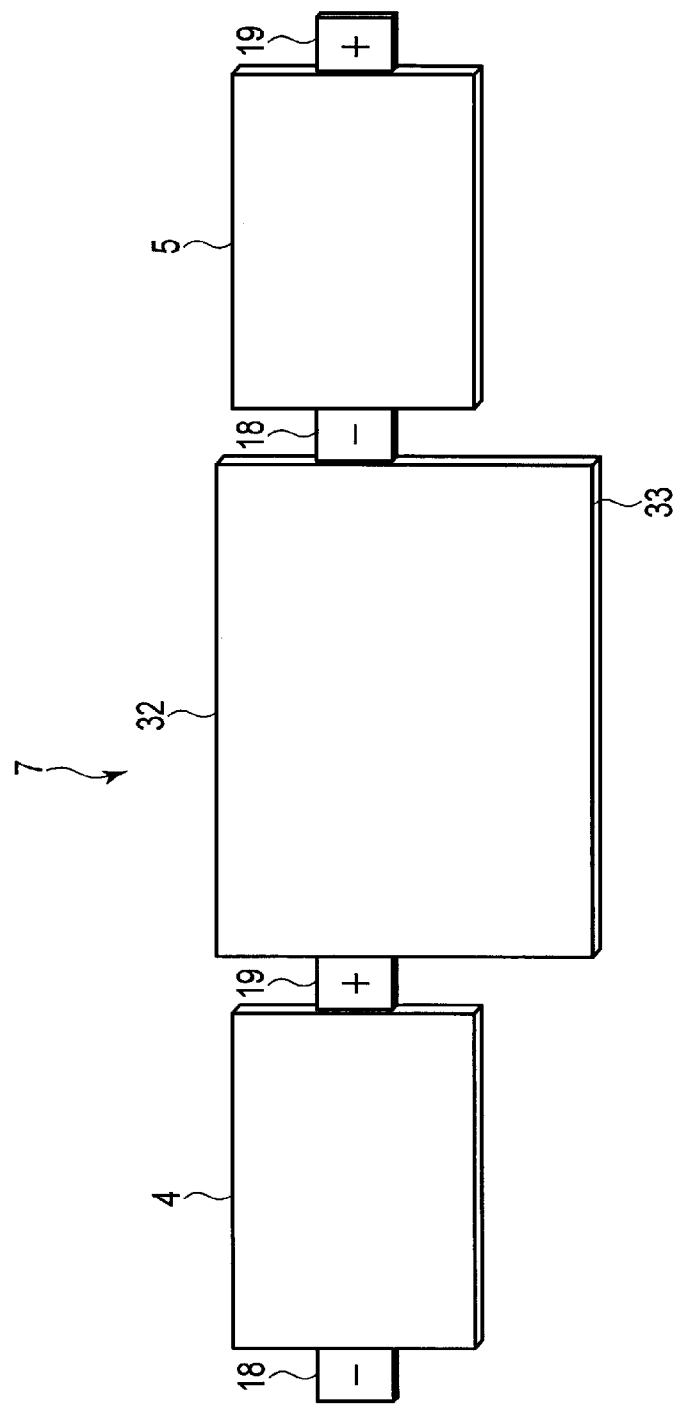
FIG. 10 is a plan view schematically showing an assembled battery of a sixth embodiment in a state in which first and second non-aqueous electrolyte batteries and a lead are spread.

FIGS. 10 to 12 show a sixth embodiment. In this embodiment, a shape of a lead 32 between the first non-aqueous electrolyte battery 4 and the second non-aqueous electrolyte battery 5 is different from that of the lead 6 between the first non-aqueous electrolyte battery 4 and the second non-aqueous electrolyte battery 5 in the assembled battery 1 of the first embodiment (see FIGS. 1 to 4B). In this embodiment, the lead 32 of this embodiment is provided with an extending portion 33 at one of both sides thereof other than the other both sides of the lead 32 to which the positive electrode tab 19 of the first non-aqueous electrolyte battery 4 and the negative electrode tab 18 of the second non-aqueous electrolyte battery 5 are connected respectively. The extending portion 33 elongates in a direction (the downward direction in FIG. 10) other than directions along which the positive electrode tab 19 of the first non-aqueous electrolyte battery 4 and the negative electrode tab 18 of the second non-aqueous electrolyte battery 5 extend.

FIG. 10 is a substantially plan view schematically showing the first non-aqueous electrolyte battery 4, second non-aqueous electrolyte battery 5 and lead 32 of an assembled battery of this embodiment in an exploded state. FIG. 11 is a perspective view showing a laminate 8 in a state in which the first non-aqueous electrolyte battery 4, second non-aqueous electrolyte battery 5 and lead 32 of the present assembled battery are folded and stacked with each other.

In this embodiment, as shown in FIG. 12, the extending portion 33 of the lead 32 is bent at right angles to form an L-shaped bent portion 34. Other portions were produced as in the first embodiment.

Seventh Embodiment

Figure 13:
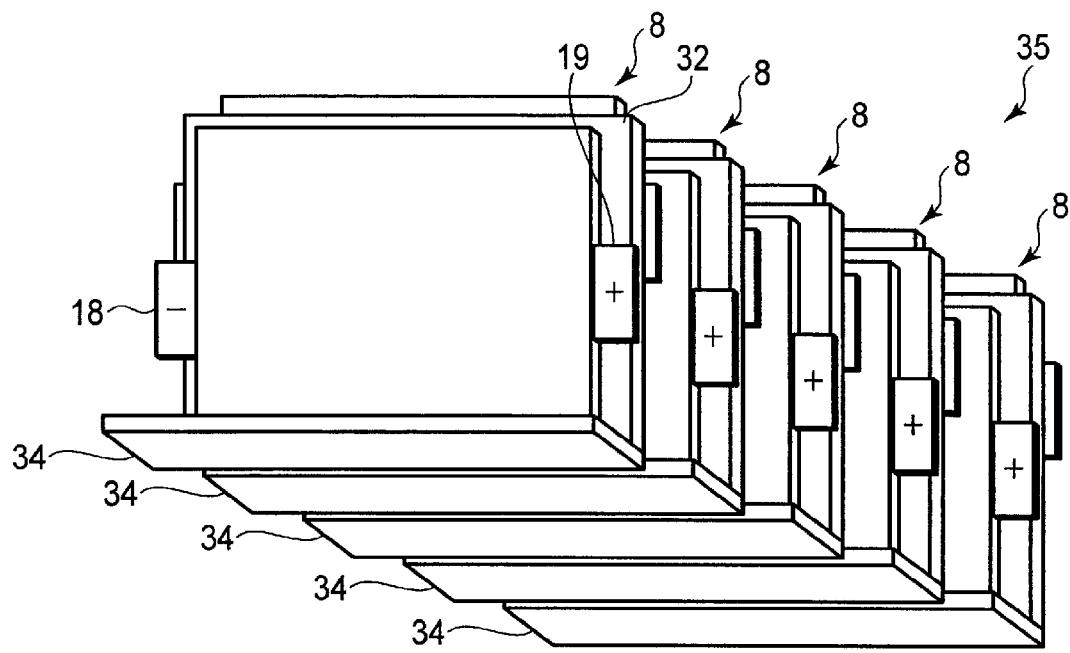
FIG. 13 is a perspective view schematically showing an assembled battery of a seventh embodiment in a state in which a group of non-aqueous electrolyte batteries and leads is folded and the batteries and the leads are stacked.
Figure 14:
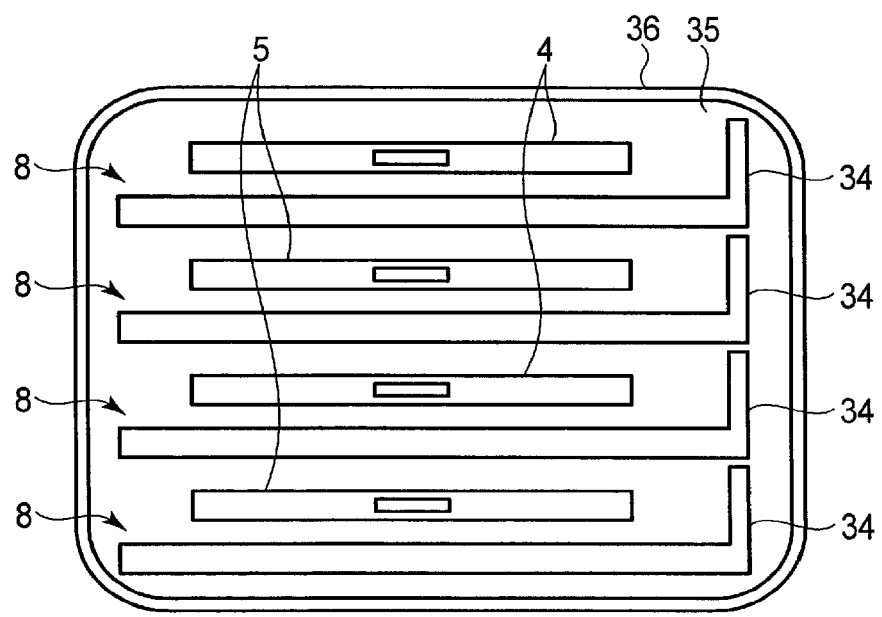
FIG. 14 is a cross-sectional view schematically showing a state in which the assembled battery of the seventh embodiment is stored in an outer case.

FIGS. 13 and 14 show a seventh embodiment. FIG. 13 is a perspective view showing a state in which a battery body 35 of this embodiment is provided by stacking the laminates 8, each including the first and second non-aqueous electrolyte batteries 4 and 5 and lead 32 of an assembled battery of the sixth embodiment (see FIGS. 10 to 12), in multiples. FIG. 14 is a cross-sectional view schematically showing a state in which the battery body 35 of FIG. 13 is stored in an outer case 36.

Eighth Embodiment

Figure 15:
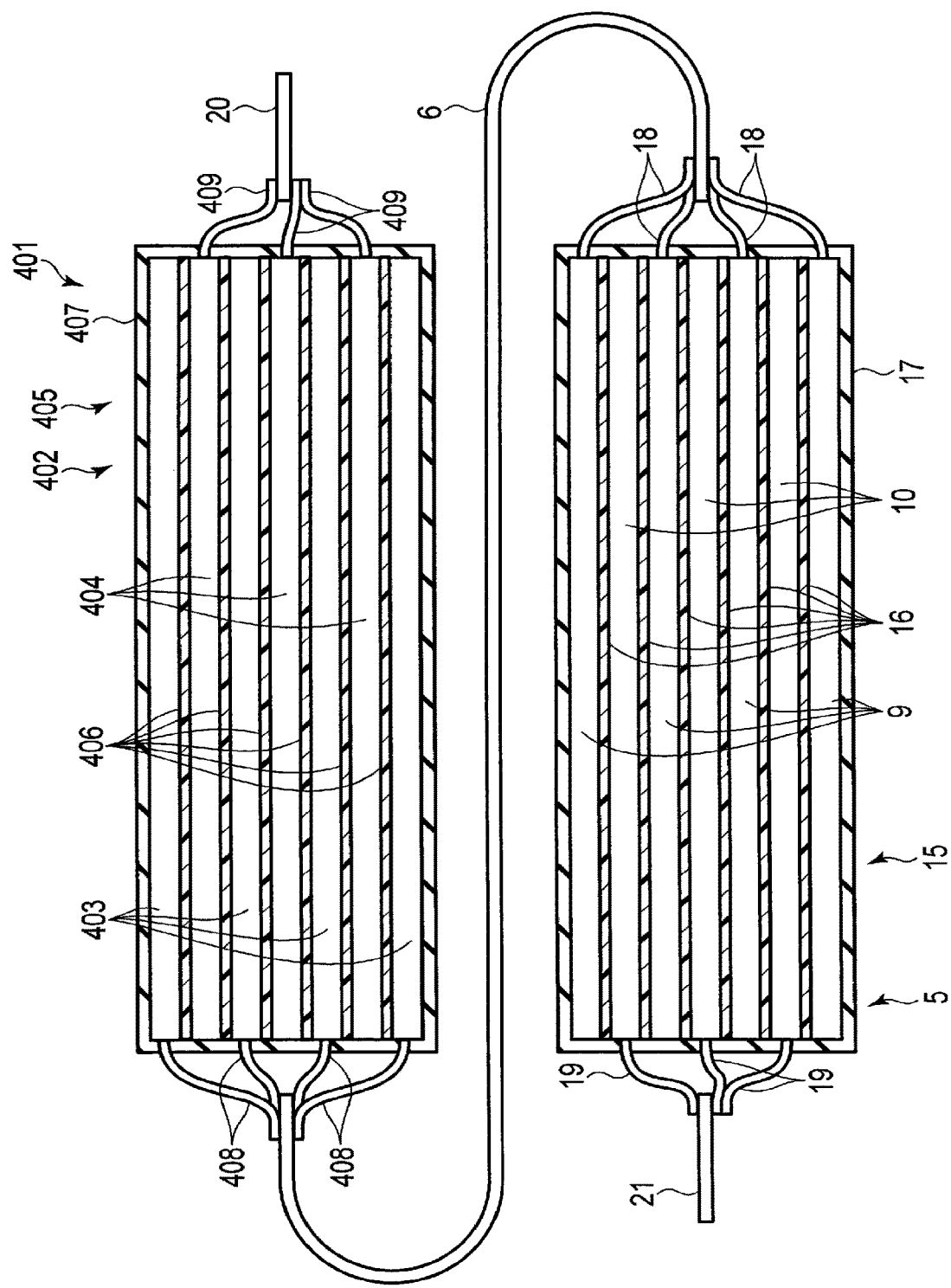
FIG. 15 is a longitudinal cross-sectional view schematically showing internal structures of laminates of an assembled battery of an eighth embodiment.

FIG. 15 shows an eighth embodiment. An assembled battery 401 of this embodiment has a first non-aqueous electrolyte battery 402 and the second non-aqueous electrolyte battery 5. In this embodiment, the first non-aqueous electrolyte battery 402 has a structure which is different from that of the first non-aqueous electrolyte battery 4 of the assembled battery 1 of the first embodiment (see FIGS. 1 to 4B), and the second non-aqueous electrolyte battery 5 has the same structure as that of the first non-aqueous electrolyte battery 4 of the first embodiment.

The first non-aqueous electrolyte battery 402 of this embodiment includes four positive electrodes 403, three negative electrodes 404 and six separators 406. The four positive electrodes 403 and the three negative electrodes 404 are alternately stacked with the six separators 406 being interposed between them to form one laminate 405 including seven stacked electrodes in total. And, the laminate 405 provides the first non-aqueous electrolyte battery 402. Here, in the laminate 405, the first positive electrode 403 is disposed in a lowermost position in FIG. 15, and the first negative electrode 404 is stacked on the first positive electrode 403 with the separator 406 being interposed between them. Then, the second positive electrode 403 is stacked on the first negative electrode 404 with the separator 406 being interposed between them. After that, the second negative electrode 404 is stacked on the second positive electrode 403 with the separator 406 being interposed between them. Moreover, the third positive electrode 403 is stacked on the second negative electrode 404 with the separators 406 between them. And then, the third negative electrode 404 is stacked on the third positive electrode 403 with the separators 406 between them. And finally, the fourth positive electrode 403 is stacked on the third negative electrode 404 with the separators 406 between them. An exterior surface of the laminate 405 is covered with an insulating layer 407 such as a separator.

The first non-aqueous electrolyte battery 402 includes positive electrode tabs 408 and negative electrode tabs 409. The positive electrode tabs 408 are provided at left end portions of the four positive electrodes 403 in FIG. 15, and the negative electrode tabs 409 are provided at right end portions of the three negative electrodes 404 in FIG. 15. The four positive electrode tabs 408 of the first non-aqueous electrolyte battery 402 are fixed and connected to one end curved portion (the left end portion in FIG. 15) of the lead 6 by welding, for example. The three negative electrode tabs 409 of the first non-aqueous electrolyte battery 402 are fixed and connected to an external connection portion 20 on a negative electrode side by welding, for example. With these connections, the four positive electrodes 403 and three negative electrodes 404 alternately stacked and forming an electrode group of the first non-aqueous electrolyte battery 402 are connected in parallel. Other portions were produced as in the first embodiment.

In the above described embodiments, the two adjacent non-aqueous electrolyte batteries may be connected with each other by a plurality of leads interposed between the two adjacent non-aqueous electrolyte batteries. In this case, it is enough that at least one lead has an area larger than an area of a side surface of each of the two adjacent non-aqueous electrolyte batteries, the side surface being opposing to the at least one lead.

[Comparison Test]

Next, in order to confirm effects of the assembled batteries of the above described embodiments having the above described structures, a test for comparing a battery capacity (Ah), an average operating voltage (V), a volume energy density (Wh/L) and a weight energy density (Wh/kg) of each of Examples 1 to 9 and those of Comparative Example 1 is conducted, and each of Examples 1 to 9 and Comparative Example 1 are as follows.

Example 1

In the electrode structure of the assembled battery 1 of the first embodiment shown in FIGS. 1 to 4B, each of the negative electrode 9 and the positive electrode 10 is a rectangular flat plate each having a size of 70 mm×90 mm. The lead 6 is formed of a rectangular flat plate-shaped aluminum foil having a size of 74 mm×100 mm.

The four negative electrode tabs 18 of the first non-aqueous electrolyte battery 4 are fixed and connected to the external connection portion 20 on the negative electrode side by welding. The three positive electrode tabs 19 of the first non-aqueous electrolyte battery 4 are fixed and connected to one end portion (the left end portion in FIG. 3) of the lead 6 by welding. With these connections, the four negative electrodes 9 and three positive electrodes 10 alternately stacked and forming an electrode group of the first non-aqueous electrolyte battery 4 are connected in parallel.

The four negative electrode tabs 18 of the second non-aqueous electrolyte battery 5 are fixed and connected to the other end portion (the right end portion in FIG. 3) of the lead 6 by welding, for example. The three positive electrode tabs 19 of the second non-aqueous electrolyte battery 5 are fixed and connected to the external connection portion 20 on the positive electrode side by welding. With these connections, the four negative electrodes 9 and three positive electrodes 10 alternately stacked and forming an electrode group of the second non-aqueous electrolyte battery 5 are connected in parallel.

Connections to the tabs of the laminate of each of the first non-aqueous electrolyte battery 4 and second non-aqueous electrolyte battery 5 are performed at the midpoint in all of the tabs by welding. After welding of each tab, the first non-aqueous electrolyte battery 4, the second non-aqueous electrolyte battery 5 and an aluminum foil of the leas 6 are connected in series in a row, then folded, and encased, whereby a test cell according to Example 1 is produced.

Example 2

The assembled battery 101 of the second embodiment is used. Five laminates each of which is the first non-aqueous electrolyte battery 4 described in Example 1 are provided, and they are connected in series as in Example 1. (See FIGS. 5A, 5B, and 6)

Example 3

The assembled battery 201 of the third embodiment is used. (See FIG. 7.)

Example 4

The assembled battery 301 of the fourth embodiment is used. (See FIG. 8)

Example 5

The assembled battery of the fifth embodiment is used. (See FIG. 9)

Example 6

An assembled battery prepared by producing insulating layers 31 of solid electrolyte particles (for example, $Li_7La_3Zr_2O_{12}$ (LLZ)) with a thickness of 3 μm on both side surfaces of the aluminum foil of the lead 6 of the assembled battery of example 5 is used. Other portions are produced as in the first embodiment. (See FIG. 9)

Example 7

An assembled battery prepared by producing insulating layers of an acrylic resin with a thickness of 1 μm on both side surfaces of the aluminum foil of the lead 6 of the assembled battery of example 5 is used. Other portions are produced as in the first embodiment. (See FIG. 9)

Example 8

The assembled battery of the sixth embodiment is used, in which the lead 32 is a rectangular flat plate-shaped aluminum foil having a size of 90 mm×100 mm and one of two longitudinally extending side portions of the rectangular flat plate is bent into an L-shape by 16 mm. (See FIGS. 10 to 12.)

Example 9

The assembled battery 401 of the eighth embodiment is used, in which the laminate of the first non-aqueous electrolyte battery 402 has the positive electrode at its uppermost layer and the laminate of the second non-aqueous electrolyte battery 5 has the negative electrode at the uppermost layer. Other portions are produced as in the first embodiment. (See FIG. 15)

Comparative Example 1

Two laminates which are encased respectively and connected in series are used. And, each of the two laminates is the laminate of the first non-aqueous electrolyte battery 4 described in Example 1.

TABLE 1

|  | Battery capacity (Ah) | Average operating voltage (V) | Volume energy density (Wh/L) | Weight energy density (Wh/kg) |
|---|---|---|---|---|
| Example 1 | 1 | 5 | 150 | 75 |
| Example 2 | 1 | 12.5 | 180 | 90 |
| Example 3 | 1 | 5 | 150 | 75 |
| Example 4 | 1 | 5 | 150 | 75 |
| Example 5 | 1 | 5 | 140 | 74 |
| Example 6 | 1 | 5 | 140 | 74 |
| Example 7 | 1 | 5 | 130 | 73 |
| Example 8 | 1 | 5 | 150 | 75 |
| Example 9 | 1 | 5 | 150 | 74 |
| Comparative Example 1 | 1 | 5 | 110 | 69 |

The results of the comparison tests between Examples 1 to 9 and Comparative Example 1 are as shown in Table 1. When each of Examples 1 to 9 and Comparative Example 1 has substantially the same condition in which the battery capacity (Ah) is 1 Ah and the average operating voltage is 5 V, it is found that, in each of Examples 1 to 9, the values of the volume energy density (Wh/L) and the weight energy density (Wh/kg) increase as compared with those of Comparative Example 1.

[Battery Pack]

Figure 17:
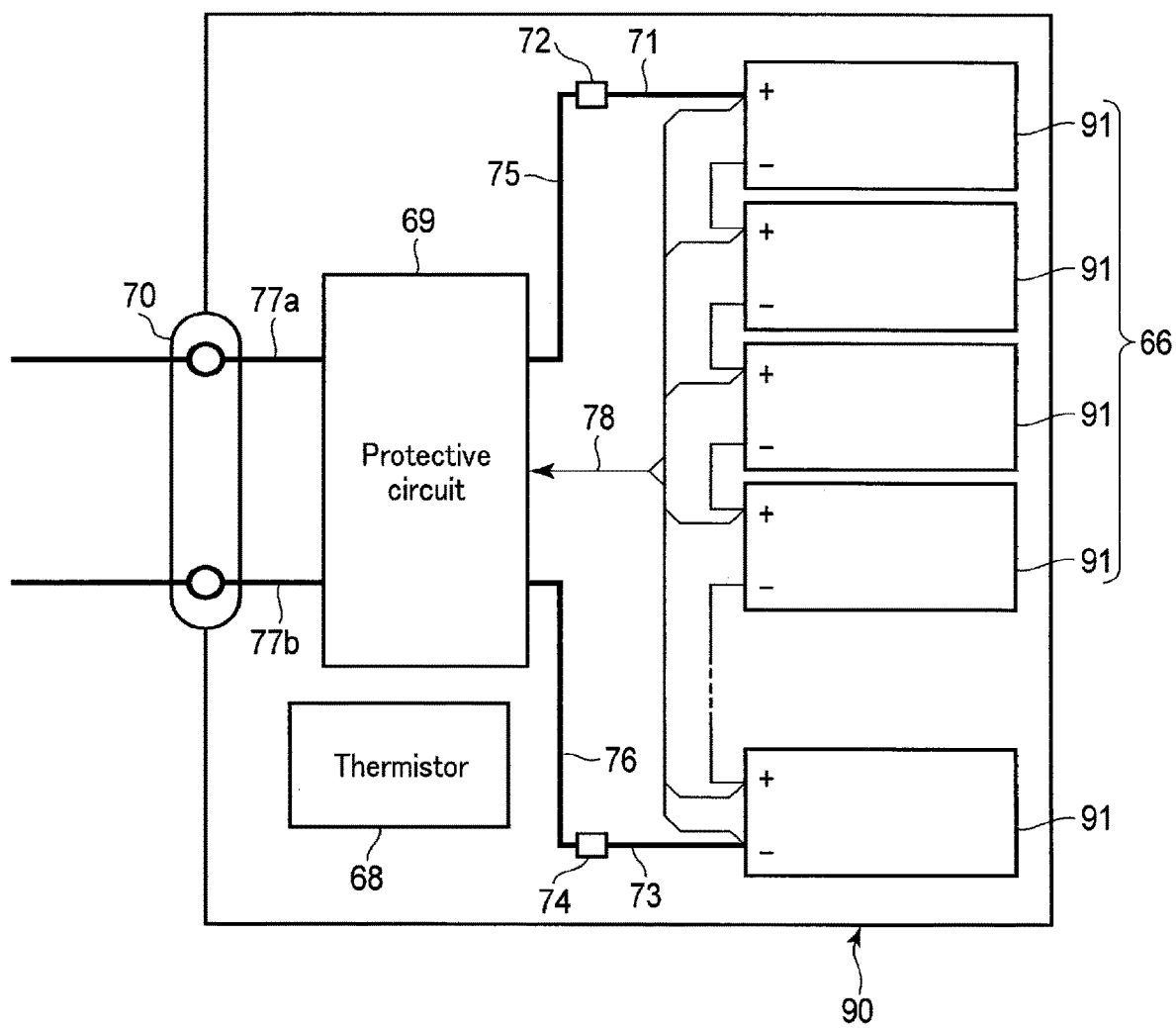
FIG. 17 is a block diagram schematically showing an electric circuit of the battery pack of FIG. 16.

FIG. 16 is an exploded perspective view schematically showing a structure of a battery pack 90. FIG. 17 is a block diagram showing an electric circuit of the battery pack 90 in FIG. 16. The battery pack 90 shown in FIGS. 15 and 16 includes a plurality of assembled batteries 91, each of which is the assembled battery 1 according to the first embodiment and described with reference to FIG. 1.

The battery pack 90 according to this embodiment can further be provided with a protective circuit. The protective circuit is used to control a charge and discharge of the assembled batteries 91. Alternatively, a circuit contained in a device (for example, an electronic device, an automobile and the like) using the battery pack 90 as a power supply can also be used as the protective circuit of the battery pack 90.

Also, the battery pack 90 according to the embodiment can further be provided with external terminals for electrifying. The external terminals for electrifying are used to output a current from the assembled batteries 91 of the battery pack 90 to an outside thereof and also to input a current from the outside thereof into the assembled batteries 91 of the battery pack 90. In other words, when the battery pack 90 is used as the power supply, a current from the assembled batteries 91 of the battery pack 90 is supplied to the outside through the external terminals for electrifying. When the battery pack 90 is charged, a current for charging (including regenerative energy from a power of an automobile) is supplied to the assembled batteries 91 of the battery pack 90 through the external terminals for electrifying.

The plurality of assembled batteries 91 are stacked such that negative electrode terminals 63 and positive electrode terminals 64 extending to the outside are aligned in the same direction, and are fastened with each other by an adhesive tape 65 to constitute a non-aqueous electrolyte battery 66. As shown in FIG. 17, these assembled batteries 91 are electrically connected to each other in series.

A printed wiring board 67 is arranged to oppose to side surfaces of the assembled batteries 91 from which the negative electrode terminals 63 and positive electrode terminals 64 of the assembled batteries 91 extend. As shown in FIG. 16, a thermistor 68, a protective circuit 69 and a terminal 70 for electrifying to external devices are mounted on the printed wiring board 67. An electrical insulating plate (not shown) for avoiding unnecessary connection to wires of the non-aqueous electrolyte battery 66 is mounted on a surface of the printed wiring board 67 opposing to the non-aqueous electrolyte battery 66.

A positive electrode lead 71 is connected to the positive electrode terminal 64 positioned in one of the both outer sided assembled batteries 91 of the non-aqueous electrolyte battery 66, and the tip end thereof is inserted into a positive electrode connector 72 of the printed wiring board 67 and is electrically connected thereto.

A negative electrode lead 73 is connected to the negative electrode terminal 63 positioned in the other of the both outer sided assembled batteries 91 of the non-aqueous electrolyte battery 66, and the tip end thereof is inserted into a negative electrode connector 74 of the printed wiring board 67 and is electrically connected thereto. These connectors 72 and 74 are connected to the protective circuit 69 through wires 75 and 76 formed on the printed wiring board 67.

The thermistor 68 detects a temperature of each assembled battery 91 and a detection signal corresponding to the temperature is sent to the protective circuit 69. The protective circuit 69 is used to control a charge and discharge of the assembled battery 91. The protective circuit 69 can cut off a positive-side wire 77a and negative-side wire 77b between the protective circuit 69 and the terminal 70 for electrifying to external devices under predetermined conditions. One of the predetermined conditions is, for example, when the temperature detected by the thermistor 68 is equal to or higher than a predetermined temperature. The other of the predetermined conditions is when an over-charge, an over-discharge, an over-current or the like of the assembled battery 91 is detected. The detection of an over-charge or the like is carried out for each of the assembled batteries 91 or the whole of the non-aqueous electrolyte battery 66.

For the detection of each of the assembled batteries 91, a battery voltage, a positive electrode potential or a negative electrode potential may be detected. When the positive electrode potential or the negative electrode potential is detected, a lithium electrode used as a reference electrode is inserted into each of the assembled batteries 91. In the battery pack 90 shown in FIGS. 16 and 17, a wire 78 for voltage detection is connected to each of the assembled batteries 91. A detection signal is sent to the protective circuit 69 through these wires 78.

A protective sheet 79 made of rubber or resin is arranged on each of three side surfaces of the non-aqueous electrolyte battery 66 excluding one side surface from which the negative electrode terminal 63 and the positive electrode terminal 64 protrude.

The non-aqueous electrolyte battery 66 together with the protective sheets 79 and the printed wiring board 67 is housed in a container 80. That is, the protective sheet 79 is arranged on each of both inner side surfaces of the container 80 extending in a long side direction and one of both inner side surfaces of the container 80 extending in a short side direction, and the printed wiring board 67 is arranged on the other of the both inner side surfaces. That is, the non-aqueous electrolyte battery 66 surrounded by the protective sheets 79 and the printed wiring board 67 is positioned in an inner space of the container 80. An opening of the container 80 is covered with a cover 81.

Instead of the adhesive tape 65, a heat-shrinkable tape may be used to fix the assembled batteries 91 of the non-aqueous electrolyte battery 66. In this case, the heat-shrinkable tape is wound around the non-aqueous electrolyte battery 66 after the protective sheets 79 are arranged on the both longitudinal side surfaces of the non-aqueous electrolyte battery 66, and then the heat-shrinkable tape is thermally shrunk to tie the assembled batteries 91 of the non-aqueous electrolyte battery 66 together with the protective sheets 79 together.

In FIGS. 16 and 17, the assembled batteries 91 are connected in series, but the assembled batteries 91 may be connected in parallel to increase a battery capacity of the non-aqueous electrolyte battery 66. A plurality of the battery packs 90 may be connected in series and/or in parallel.

Also, a form of the battery pack 90 is appropriately changed according to its uses. The battery pack 90 is preferably used for a use that requires a good cycle characteristic under a large current. As concrete uses, a power supply of a digital camera and an on-board power supply used for vehicles such as two-wheeled to four-wheeled hybrid electric vehicles, two-wheeled to four-wheeled electric vehicles and motor-assisted bicycles can be cited. The battery pack 90 is particularly suitable for on-board uses. When the battery pack 90 is mounted on a vehicle and is used as a power source thereof, the battery pack 90 may recover a regenerative energy regenerated from a power of the vehicle.

[Automobile]

Figure 18:
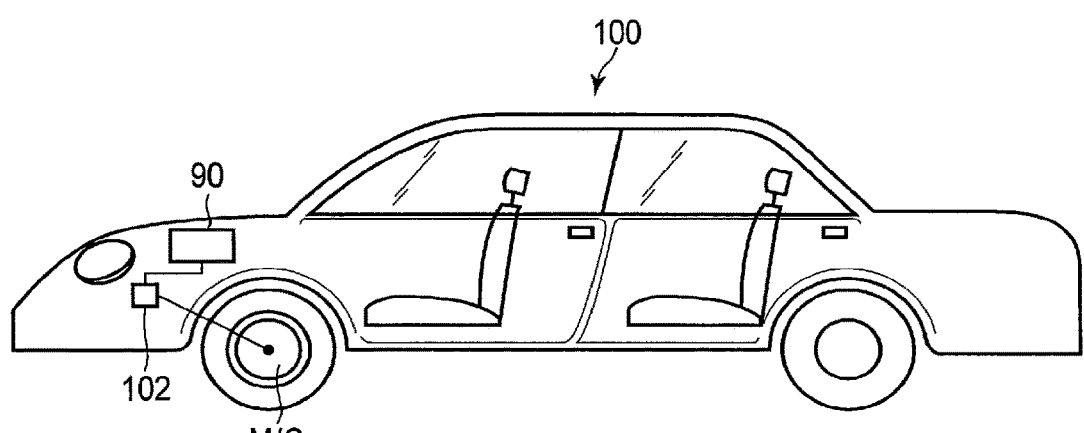
FIG. 18 is a view schematically showing an automobile of an embodiment of a vehicle in which the battery pack of FIG. 16 is mounted.

FIG. 18 shows an example of an automobile 100 that is a kind of a vehicle and that comprises the battery pack 90 (see FIG. 16) of the non-aqueous electrolyte battery 66 according to the first embodiment.

The battery pack 90 is installed in an engine room of the automobile 100. The installing position of the battery pack 90 is not limited to the engine room. For example, the battery pack 90 may also be positioned in a rear part of the automobile 100 or under seats of the automobile 100. In this example, the battery pack 90 is configured to recover a regenerative energy of a power of the vehicle. A motor/generator M/G is coupled to the wheels of the automobile 100, and the battery pack 90 is combined with a control unit 102 connected to the motor/generator M/G. The control unit 102 is configured to selectively supply an electric power of the battery pack 90 to the motor/generator M/G or recover a regenerative energy of a power of the vehicle to the battery pack 90.

According to the above embodiments, it is possible to provide an assembled battery which can prevent liquid junction between non-aqueous electrolyte batteries when a plurality of non-aqueous electrolyte batteries and leads are connected in series in a container for storing a battery body, a battery pack which comprises the assembled batteries, and a vehicle which comprises the battery pack.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An assembled battery comprising:
a plurality of non-aqueous electrolyte batteries laminated with each other; and
at least one lead being interposed between two adjacent non-aqueous electrolyte batteries, being connected to the two adjacent non-aqueous electrolyte batteries and having an area larger than an area of a side surface of each of the two adjacent non-aqueous electrolyte batteries, the side surface being opposing to the at least one lead,
wherein each non-aqueous electrolyte battery includes at least one positive electrode, at least one negative electrode and a non-aqueous electrolyte, the at least one positive electrode including a positive electrode current collector and positive electrode active material layers provided on both side surfaces of the positive electrode current collector, the at least one negative electrode including a negative electrode current collector and negative electrode active material layers provided on both side surfaces of the negative electrode current collector,
one end of the at least one lead being connected to the positive electrode of one of the two adjacent non-aqueous electrolyte batteries,
another end of the at least one lead being connected to the negative electrode of another battery of the two adjacent non-aqueous electrolyte batteries, and
the at least one lead being integrally formed of a single member.

2. The assembled battery according to claim 1, wherein, when an electrical resistance of each non-aqueous electrolyte battery is represented by RA and an electrical resistance of the lead is represented by RB, these electrical resistances RA and RB are so set such that RA≥RB.

3. The assembled battery according to claim 1, wherein each non-aqueous electrolyte battery includes tab portions for external connection,
the lead includes connecting portions for connecting the tab portions of the non-aqueous electrolyte battery, and
each connecting portions of the lead includes a curved portion.

4. The assembled battery according to claim 1, wherein each non-aqueous electrolyte battery includes tab portions for external connection, and
the lead has a bent portion funned by bending at least one side portion located in a direction other than directions in which portions for connecting with the tab portions are located.

5. The assembled battery according to claim 1, wherein the negative electrode active material layer at least one negative electrode active material selected from the group consisting of a lithium titanium oxide, a titanium oxide, a niobium titanium oxide and a lithium sodium niobium titanium oxide.

6. The assembled battery according to claim 1, wherein the non-aqueous electrolyte comprises a solid polymer electrolyte or a gel polymer electrolyte.

7. A battery pack comprising:
a plurality of assembled batteries, the assembled batteries being stacked and fastened with each other and electrically connected with each other,
each assembled battery comprising:
a plurality of non-aqueous electrolyte batteries laminated with each other; and
at least one lead being interposed between two adjacent non-aqueous electrolyte batteries, being connected to the two adjacent non-aqueous electrolyte batteries and having an area larger than an area of a side surface of each of the two adjacent non-aqueous electrolyte batteries, the side surface being opposing to the at least one lead, wherein each non-aqueous electrolyte battery includes at least one positive electrode, at least one negative electrode and a non-aqueous electrolyte, the at least one positive electrode including a positive electrode current collector and positive electrode active material layers provided on both side surfaces of the positive electrode current collector, the at least one negative electrode including a negative electrode current collector and negative electrode active material layers provided on both side surfaces of the negative electrode current collector, one end of the at least one lead being connected to the positive electrode of one of the two adjacent non-aqueous electrolyte batteries, another end of the at least one lead being connected to the negative electrode of another battery of the two adjacent non-aqueous electrolyte batteries, and the at least one lead being integrally formed of a single member.

8. The battery pack according to claim 7, wherein, when air electrical resistance of each non-aqueous electrolyte battery is represented by RA and an electrical resistance of the lead is represented by RB, these electrical resistances RA and RB are so set such that RA≥RB.

9. The battery pack according to claim 7, wherein each non-aqueous electrolyte battery includes tab portions for external connection, the lead includes connecting portions for connecting the tab portions of the non-aqueous electrolyte battery, and each connecting portions of the lead includes a curved portion.

10. The battery pack according to claim 7, wherein each non-aqueous electrolyte battery includes tab portions for external connection, and the lead has a bent portion formed by bending at least one side portion located in a direction other than directions in which portions for connecting with the tab portions are located.

11. The battery pack according to claim 7, wherein the negative electrode active material layer comprises at least one negative electrode active material selected from the group consisting of a lithium titanium oxide, a titanium oxide, a niobium titanium oxide and a lithium sodium niobium titanium oxide.

12. The battery pack according to claim 7, wherein the non-aqueous electrolyte comprises a solid polymer electrolyte or a gel polymer electrolyte.

13. The battery pack according to claim 7, further comprising:

external terminals for electrifying and;

a protective circuit for controlling the assembled batteries.

14. A vehicle comprising:

a battery pack including a plurality of assembled batteries, the assembled batteries being stacked and fastened with each other and electrically connected with each other, each assembled battery comprising:

plurality of non-aqueous electrolyte batteries laminated with each other; and at least one lead being interposed between two adjacent non-aqueous electrolyte batteries, being connected to the two adjacent non-aqueous electrolyte batteries and having an area larger than an area of a side surface of each of the two adjacent non-aqueous electrolyte batteries, the side surface being opposing to the at least one lead, wherein each non-aqueous electrolyte battery includes at least one positive electrode, at least one negative electrode and a non-aqueous electrolyte, the at least one positive electrode including a positive electrode current collector and positive electrode active material layers provided on both side surfaces of the positive electrode current collector, the at least one negative electrode including a negative electrode current collector and negative electrode active material layers provided on both side surfaces of the negative electrode current collector, one end of the at least one lead being connected to the positive electrode of one of the two adjacent non-aqueous electrolyte batteries, another end of the at least one lead being connected to the negative electrode of another battery of the two adjacent non-aqueous electrolyte batteries, and the at least one lead being integrally formed of a single member.

15. The vehicle according to claim 14, wherein the battery pack is configured to collects regenerative energy of a power of the vehicle.

16. The vehicle according to claim 14, wherein, when an air electrical resistance of each non-aqueous electrolyte battery is represented by RA and an electrical resistance of the lead is represented by RB, these electrical resistances RA and RB are so set such that RA≥RB.

17. The vehicle according to claim 14, wherein each non-aqueous electrolyte battery includes tab portions for external connection, and the lead has a bent portion formed by bending at least one side portion located in a direction other than directions in which portions for connecting with the tab portions are located.

18. The vehicle according to claim 14, wherein the negative electrode active material layer comprises at least one negative electrode active material selected from the group consisting of a lithium titanium oxide, a titanium oxide, a niobium titanium oxide and a lithium sodium niobium titanium oxide.

19. The vehicle according to claim 14, wherein the non-aqueous electrolyte comprises a solid polymer electrolyte or a gel polymer electrolyte.

20. The vehicle according to claim 14, wherein the battery pack further comprises:

external terminals for electrifying; and a protective circuit for controlling the assembled batteries.

* * * * *